(12) United States Patent
Taniike

(10) Patent No.: US 10,802,314 B2
(45) Date of Patent: Oct. 13, 2020

(54) LIQUID CRYSTAL DISPLAY DEVICE

(71) Applicant: SHARP KABUSHIKI KAISHA, Sakai, Osaka (JP)

(72) Inventor: Kohshiroh Taniike, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/633,518

(22) PCT Filed: Jul. 20, 2018

(86) PCT No.: PCT/JP2018/027204
§ 371 (c)(1),
(2) Date: Jan. 23, 2020

(87) PCT Pub. No.: WO2019/021946
PCT Pub. Date: Jan. 31, 2019

(65) Prior Publication Data
US 2020/0233257 A1    Jul. 23, 2020

(30) Foreign Application Priority Data

Jul. 27, 2017 (JP) .................................. 2017-145672

(51) Int. Cl.
*G02F 1/1333* (2006.01)
*G02F 1/1339* (2006.01)
*G02F 1/1337* (2006.01)

(52) U.S. Cl.
CPC ...... *G02F 1/133308* (2013.01); *G02F 1/1337* (2013.01); *G02F 1/1339* (2013.01)

(58) Field of Classification Search
CPC ................................................ G02F 1/133308
See application file for complete search history.

(56) References Cited

U.S. PATENT DOCUMENTS

| | | | |
|---|---|---|---|
| 2011/0007233 A1 | 1/2011 | Matsui et al. | |
| 2013/0215353 A1 | 8/2013 | Matsui et al. | |
| 2015/0062515 A1* | 3/2015 | Tomioka | G02F 1/133345 349/123 |

(Continued)

FOREIGN PATENT DOCUMENTS

| | | |
|---|---|---|
| CN | 105093644 A | 11/2015 |
| JP | 2010-170038 A | 8/2010 |

(Continued)

*Primary Examiner* — Edmond C Lau
(74) *Attorney, Agent, or Firm* — ScienBiziP, P.C.

(57) ABSTRACT

The present invention provides a liquid crystal display device in which display unevenness is reduced in an edge portion of a display region and the forming position of an alignment film is suitably adjusted. A liquid crystal display device includes: a display region for displaying an image; a frame region surrounding the display region; a first substrate including an insulating substrate; a second substrate facing the first substrate; a liquid crystal layer between the first substrate and the second substrate; and an alignment film on a liquid crystal layer side of the insulating substrate, the first substrate in a plan view including a groove extending to surround the display region, the groove including a first side wall on a display region side and a second side wall on a side remote from the display region, the first side wall having a smaller inclination than the second side wall.

8 Claims, 16 Drawing Sheets

(56) References Cited

U.S. PATENT DOCUMENTS

2015/0168755 A1    6/2015   Matsui et al.
2017/0219873 A1    8/2017   Lo et al.

FOREIGN PATENT DOCUMENTS

| JP | 2011-017834 A | 1/2011 |
| JP | 2015-049434 A | 3/2015 |
| WO | 2014/083807 A1 | 6/2014 |

\* cited by examiner (a)

(b)

(a)

(b)

(a)

(b)

(c)

(a)

(b)

(a)

(b)

(a)

(b)

(c)

LIQUID CRYSTAL DISPLAY DEVICE

TECHNICAL FIELD

The present invention relates to liquid crystal display devices. The present invention specifically relates to a liquid crystal display device including an alignment film.

BACKGROUND ART

A liquid crystal display device includes a liquid crystal display panel and controls transmission/shielding of light (ON/OFF of display) by controlling the alignment of birefringent liquid crystal molecules. In a liquid crystal display device, the alignment of liquid crystal molecules with no voltage applied is typically controlled by an alignment film having been subjected to alignment treatment.

For example, Patent Literature 1 discloses as a liquid crystal display device including an alignment film a liquid crystal display device including a display area and a frame part. The frame part has a flat portion in an area close to the display area and a groove structure formed in the organic insulation film in an area away from the display area. The flat portion includes a film stack containing an organic insulation film, a transparent conductive film, and an alignment film stacked in this order. The groove structure is continuous surrounding the display area.

CITATION LIST

Patent Literature

Patent Literature 1: JP 2015-49434 A

SUMMARY OF INVENTION

Technical Problem

A liquid crystal display device includes paired substrates and a liquid crystal layer containing liquid crystal molecules therebetween. The paired substrates are bonded to each other with a sealant surrounding the liquid crystal layer so as to hold the liquid crystal layer.

An alignment film in a liquid crystal display device, which controls the alignment of liquid crystal molecules, is commonly formed, for example, as follows: a liquid, highly fluid liquid crystal aligning agent (varnish) in which a resin material such as polyimide resin is dissolved in a solvent is applied to a substrate by a technique such as an ink-jet method, the solvent is removed by heating, and the resin material is baked. In this case, when alignment films are formed in a display region in the paired substrates of the liquid crystal display device, the liquid crystal aligning agent spreads on the substrate, and the alignment films are likely to spread toward a (outside) region surrounding the display region.

In order to reduce the spread of the liquid crystal aligning agent and to improve the accuracy of the forming position of the alignment film, a member such as a rib formed from a spacer material or a groove formed from an organic insulating film has been formed in a frame region to prevent the spread of the alignment film.

FIG. 15 includes views each showing a liquid crystal display device of Comparative Embodiment 1: FIG. 15(a) is a schematic plan view of a blocking structure, FIG. 15(b) is a schematic cross-sectional view of a groove-like blocking structure as an exemplary blocking structure, and FIG. 15(c) is a schematic cross-sectional view of a rib-like blocking structure as an exemplary blocking structure. FIG. 15(b) and FIG. 15(c) each illustrate a cross section taken along the line R1-R2 in FIG. 15(a).

There are two methods for controlling the spread of the liquid crystal aligning agent in the liquid crystal display device. One is a method for forming a groove 150R in a frame region as shown in FIG. 15(b). The groove 150R can be formed in a transparent organic insulating film, for example, and can block the liquid crystal aligning agent by the surface tension at an upper edge 150DR of the groove 150R. Thereby, an alignment film 30R can be formed on the display region side of the groove 150R.

The other is a method for forming a rib 250R in the frame region as shown in FIG. 15(c). The rib 250R can be formed from a photo spacer material, for example, and can block the liquid crystal aligning agent at an upper edge 250DR of the rib 250R. Thereby, the alignment film 30R can be formed on the display region side of the rib 250R.

FIG. 16 is a micrograph of the boundary between a display region and a frame region of a TFT substrate of the liquid crystal display device of Comparative Embodiment 1. FIG. 17 is a photograph of stain in the display region of the liquid crystal display device of Comparative Embodiment 1. In the TFT substrate of the liquid crystal display device of Comparative Embodiment 1, the groove 150R can block the liquid crystal aligning agent, preventing the spread of the liquid crystal aligning agent. However, when the spread of the liquid crystal aligning agent is prevented by the groove 150R, the excess liquid crystal aligning agent accumulates on the display region side of the groove 150R, which may cause unevenness (about 10 to 20 nm) of the thickness of the alignment film 30R in a region surrounded by the dotted line in FIG. 16. The unevenness of the thickness causes stain, i.e., display unevenness, in part of an edge portion of the display region as shown in FIG. 17 after evaluating the change over time of the liquid crystal display device by a reliability test. This may deteriorate the quality of the liquid crystal display device. When the unevenness of the thickness is noticeable, the film transmittance is low, which may cause luminance unevenness, a type of display unevenness, even in an early stage before the reliability test. In particular, in a narrow frame type device with a narrow frame region having a black matrix with a small width, the unevenness of the thickness significantly affects the display region.

In the above description, the display unevenness in the liquid crystal display device of Comparative Embodiment 1 after the reliability test has been described with reference to FIG. 17. The display unevenness can occur in an actual use environment or after long-term storage as well as due to the reliability test having a meaning of an emphasized test or an acceleration test in an actual use environment. The following describes an exemplary case in which the display unevenness remarkably occurs in the edge portion of the display region due to moisture absorption.

In a narrow frame type device including a sealing member with a narrow width, moisture may penetrate inside a liquid crystal panel through a bulk itself of the sealing member or from an adhesive interface between an upper or lower substrate and the sealing member due to low adhesion strength. The moisture penetrating inside the liquid crystal panel may reduce the resistance value of the alignment film itself and the uneven thickness of the alignment film may cause noticeable display unevenness, or the moisture may reduce the resistance value of a base, not the resistance value of the alignment film, causing display unevenness. In the latter case, the alignment film serves as an overcoat of the base, but its uneven thickness causes unevenness of its effect, causing display unevenness. In this case, there is a significant difference between the former and latter cases in timing of the occurrence of display unevenness due to change over time. In the former case, display unevenness occurs due to the "reliability test", whereas in the latter case, display unevenness may occur several months later (sometimes after more than half a year). Such display unevenness occurs as stain in stock items.

In the liquid crystal display device of Patent Literature 1, a groove and a projection control the spread of the alignment film solution (liquid crystal aligning agent). The alignment film solution prevented from spreading by the surface tension at a side wall of the groove has nowhere to flow, rebounds in the display region, and accumulates on the display region side, causing unevenness. As a result, the unevenness of the thickness of the alignment film occurs in the edge portion of the display region. Although the unevenness of the thickness of the alignment film is very moderately illustrated in FIG. 3 in Patent Literature 1, it actually has a great effect on the display region and cannot be ignored.

The present invention has been made in view of such a current state of the art and aims to provide a liquid crystal display device in which display unevenness is reduced in an edge portion of a display region and the forming position of an alignment film is suitably adjusted.

Solution to Problem

The present inventors conducted various studies on a liquid crystal display device in which display unevenness is reduced in an edge portion of a display region and the forming position of an alignment film is suitably adjusted, and they focused on a groove-like blocking structure that reduces the spread of a liquid crystal aligning agent. They found the following: when a first side wall on a display region side has a smaller inclination than a second side wall on a side remote from the display region in a groove, the surface tension at an upper edge of the first side wall is low, and the liquid crystal aligning agent easily flows into the groove along the first side wall when the liquid crystal aligning agent is applied to form the alignment film. Thereby, less excess liquid crystal aligning agent accumulates on the display region side of the groove that is shielded from light with a black matrix layer, and unevenness of the thickness of the alignment film can be reduced. Thus, display unevenness can be reduced in the edge portion of the display region. They also found the following: when the first side wall has a smaller inclination than the second side wall, that is, the second side wall has a larger inclination than the first side wall, the liquid crystal aligning agent flowing into the groove does not easily spread out over the second side wall due to the surface tension at an upper edge of the second side wall and can be prevented from flowing out toward the side remote from the display region. Thereby, the position of an edge of the alignment film can be suitably adjusted. Accordingly, the present inventors have arrived at the solution to the above problem, completing the present invention.

In other words, an aspect of the present invention may be a liquid crystal display device including: a display region for displaying an image; a frame region surrounding the display region; a first substrate including an insulating substrate; a second substrate facing the first substrate; a liquid crystal layer between the first substrate and the second substrate; and an alignment film on a liquid crystal layer side of the insulating substrate, the first substrate in a plan view including a groove extending to surround the display region, the groove including a first side wall on a display region side and a second side wall on a side remote from the display region, the first side wall having a smaller inclination than the second side wall.

The first side wall may have an average inclination angle of less than 50°, and the second side wall may have an average inclination angle of 60° or more and 90° or less.

The first side wall may have an inclination increasing toward a lower edge from an upper edge.

The first substrate may include a plurality of the grooves.

The groove may be a first groove, the first substrate in a plan view has a corner formed by a first side and a second side and further includes a second groove, the second groove in a plan view is disposed between the first groove and the display region and extends to surround the display region, and the second groove in a plan view includes an uneven portion at the corner of the first substrate.

The uneven portion may have a rectangular waveform, the uneven portion having a rectangular waveform of the second groove includes parallel portions each extending along the first side of the first substrate and crossing portions each extending in a direction crossing the first side, the parallel portions each include a third side wall on the display region side and a fourth side wall on the side remote from the display region, the third side wall has a smaller inclination than the fourth side wall, the crossing portions each include paired side walls, that is, four side walls of two of the crossing portions constituting a protrusion protruding to the display region side of the uneven portion having a rectangular waveform, a side wall remotest from the second side of the first substrate among the four side walls has a smaller inclination than any of the other three side walls.

The liquid crystal display device may further include a sealing member that is in contact with the first substrate and the second substrate and extends to surround the display region in a plan view, in which the groove in a plan view is closer to the display region than the sealing member.

The liquid crystal display device may further include a sealing member that is in contact with the first substrate and the second substrate and extends to surround the display region in a plan view, in which the groove in a plan view at least partly overlaps the sealing member.

Advantageous Effects of Invention

The present invention can provide a liquid crystal display device in which display unevenness is reduced in an edge portion of a display region and the forming position of an alignment film is suitably adjusted.

BRIEF DESCRIPTION OF DRAWINGS

FIG. 3(a) is a schematic cross-sectional view of a portion in the vicinity of a frame region and FIG. 3(b) is a schematic cross-sectional view of a portion in the vicinity of a groove.

FIG. 4(a) is a schematic cross-sectional view of an exemplary groove 1 and FIG. 4(*b*) is a schematic cross-sectional view of an exemplary groove 2.

FIG. 15(*a*) is a schematic plan view of a blocking structure, FIG. 15(*b*) is a schematic cross-sectional view of a groove-like blocking structure as an exemplary blocking structure, and FIG. 15(*c*) is a schematic cross-sectional view of a rib-like blocking structure as an exemplary blocking structure.

FIG. 21(*a*) is a schematic view of the formation of a liquid pool of a liquid crystal aligning agent and FIG. 21(*b*) is a schematic view of an overflow from a groove.

FIG. 22(*a*) is a schematic plan view of an exemplary liquid crystal display device 1 where an edge of the liquid crystal aligning agent application region is nonlinear and wavy and FIG. 22(*b*) is a schematic plan view of an exemplary liquid crystal display device 2 where an edge of the liquid crystal aligning agent application region is linear.

FIG. 23(*a*) is a schematic cross-sectional view taken along the line X1-X2 in FIG. 22(*a*), FIG. 23(*b*) is a schematic cross-sectional view taken along the line Y1-Y2 in FIG. 22(*a*), and FIG. 23(*c*) is a schematic cross-sectional view taken along the line Z1-Z2 in FIG. 22(*b*).

DESCRIPTION OF EMBODIMENTS

Hereinafter, the present invention is described in more detail based on embodiments with reference to the drawings. The embodiments, however, are not intended to limit the scope of the present invention. The configurations of the embodiments may appropriately be combined or modified within the spirit of the present invention.

Exemplary display (liquid crystal alignment) modes of liquid crystal display devices include a twisted nematic (TN) mode in which liquid crystal molecules having positive anisotropy of dielectric constant are aligned with 90° twist when seen in the normal direction of a substrate, a vertical alignment (VA) mode in which liquid crystal molecules having negative anisotropy of dielectric constant are aligned in a direction perpendicular to a substrate surface, and modes easily impart wide viewing angle characteristics such as an in-plane switching (IPS) mode and a fringe field switching (FFS) mode in which liquid crystal molecules having positive or negative anisotropy of dielectric constant are aligned in parallel with a substrate surface, and a transverse electric field is applied to a liquid crystal layer. In the following embodiments, a FFS mode liquid crystal display will be employed, but any display mode may be applied.

Embodiment 1

Figure 1:
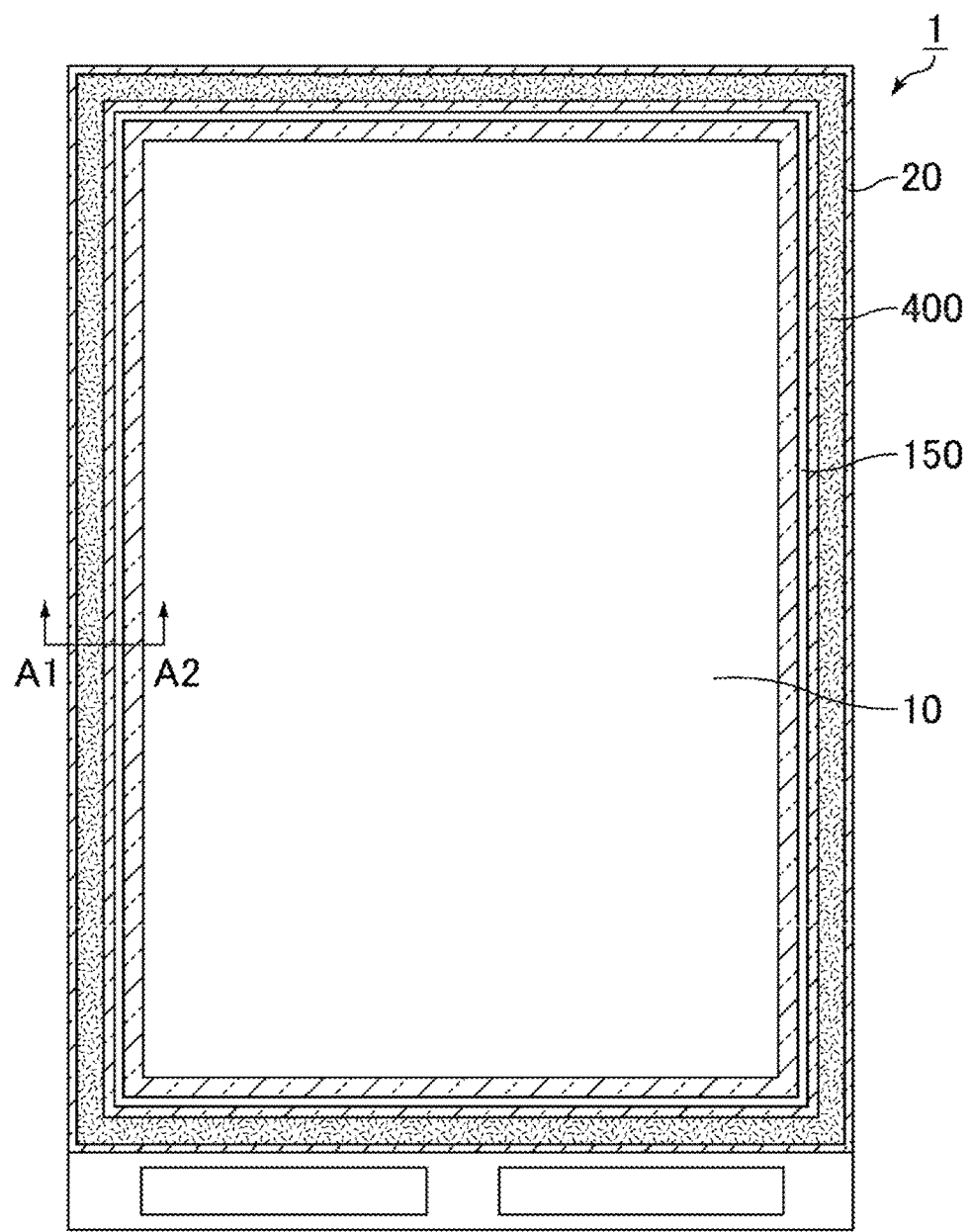
FIG. 1 is a schematic plan view of a liquid crystal display device of Embodiment 1.

FIG. 1 is a schematic plan view of a liquid crystal display device of Embodiment 1. As shown in FIG. 1, a liquid crystal display device 1 of the present embodiment includes a display region 10 and a frame region 20 surrounding the display region 10. In the frame region 20 in a plan view, a ring-shaped groove 150 extending to surround the display region 10 (also referred to as a groove in an area surrounding a panel) and a ring-shaped sealing member 400 extending to surround the display region 10. The groove 150 is disposed closer to the display region 10 than the sealing member 400.

The display region 10 displays an image and includes pixels arranged in a matrix. The frame region 20 is a non-display region that surrounds the display region 10 and does not contribute to display, and includes a black matrix layer.

Figure 2:
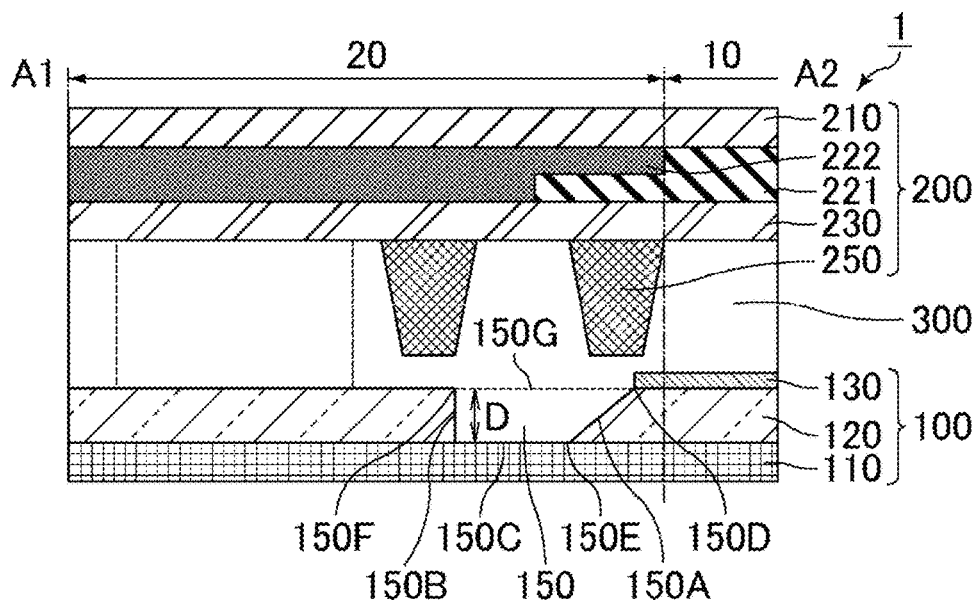
FIG. 2 is a schematic cross-sectional view of the liquid crystal display device of Embodiment 1 before formation of an alignment film and a sealing member.
Figure 3:
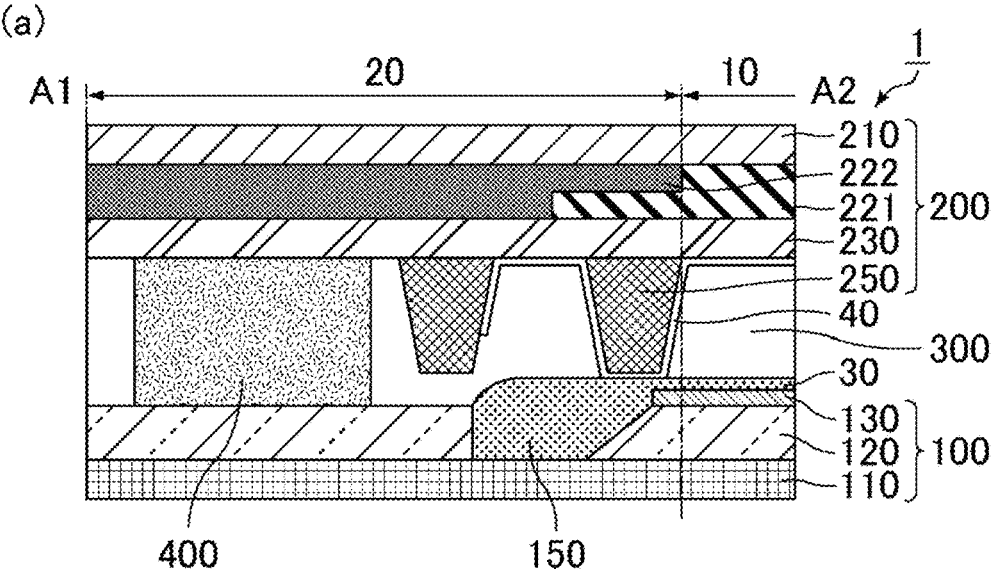
FIG. 3 includes views each showing the liquid crystal display device of Embodiment 1.
Figure 3:
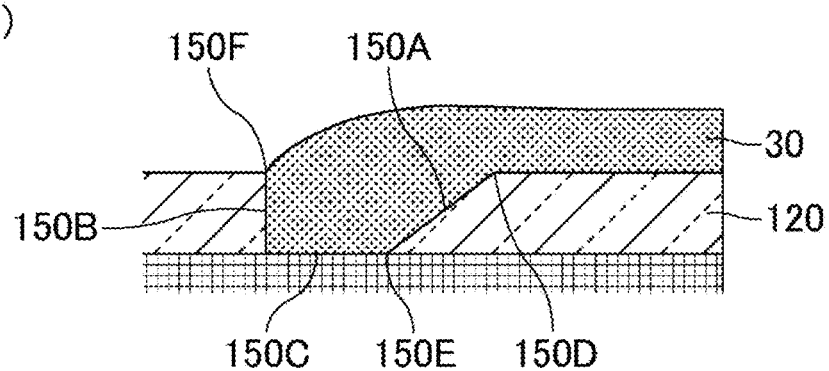

FIG. 2 is a schematic cross-sectional view of the liquid crystal display device of Embodiment 1 before formation of an alignment film and the sealing member. FIG. 3 includes views each showing the liquid crystal display device of Embodiment 1: FIG. 3(*a*) is a schematic cross-sectional view of a portion in the vicinity of the frame region and FIG. 3(*b*) is a schematic cross-sectional view of a portion in the vicinity of the groove. FIG. 2 and FIG. 3(*a*) each illustrate a cross section taken along the A1-A2 in FIG. 1. In FIG. 2, a space between the dashed lines indicates a position where the sealing member 400 is to be formed using a sealant. In order to clearly illustrate the position of the groove 150, FIG. 2 illustrates a first substrate 100 with no alignment film 30 and a second substrate 200 with no alignment film 40 facing each other. In the actual manufacturing steps, the alignment films 30 and 40 are formed respectively in the first substrate 100 and the second substrate 200, and then the substrates facing each other are bonded with the sealing member 400.

As shown in FIG. 2 and FIG. 3, the liquid crystal display device 1 of the present embodiment includes the first substrate 100, the second substrate 200 facing the first substrate 100, a liquid crystal layer 300 between the first substrate 100 and the second substrate 200, and the sealing member 400 in contact with the first substrate 100 and the second substrate 200.

The first substrate 100 includes, in the order towards the liquid crystal layer 300, an insulating substrate 110, a transparent organic insulating film 120, a planar common electrode, an interlayer insulating film, and pixel electrodes 130 with slits. The transparent organic insulating film 120 includes the groove 150 in the frame region 20.

The first substrate 100 includes on the insulating substrate 110 scanning lines, data lines, and thin-film transistors (TFTs) connected to the scanning lines and the data lines. These lines are covered with the transparent organic insulating film 120. In other words, the first substrate 100, which is also referred to as a TFT substrate, can control the alignment of liquid crystal molecules in the liquid crystal layer 300 by varying the voltage applied between the pixel electrodes 130 and the common electrode using the TFTs. The position of the common electrode and the pixel electrode 130 may be switched so that the common electrode with a slit is disposed on a liquid crystal layer 300 side of the planar pixel electrode 130.

The second substrate 200 includes, in the order towards the liquid crystal layer 300, an insulating substrate 210, a color material layer 221, a black matrix layer 222, and an overcoat layer 230. The second substrate 200 further includes rib 250s formed from a photo spacer material. The second substrate 200 including the color material layer 221 is also referred to as a color filter substrate (CF substrate). The second substrate 200 is further also referred to as a counter substrate.

The alignment film 30 is disposed between the first substrate 100 and the liquid crystal layer 300, and the alignment film 40 is disposed between the second substrate 200 and the liquid crystal layer 300.

The insulating substrates 110 and 210 each may be formed from any transparent base material such as glass or plastic.

The transparent organic insulating film 120 may be formed from a material such as an acrylic organic resin. The transparent organic insulating film 120 preferably has a thickness of 1 μm or greater and 5 μm or smaller, more preferably 1.5 μm or greater and 4 μm or smaller, still more preferably 2 μm or greater and 3 μm or smaller. The term "transparent" herein means that the transmittance of visible light is 90% or higher.

The common electrode and the pixel electrodes 130 can be formed, for example, as follows: a single or multiple layers of a transparent conductive material such as indium tin oxide (ITO), indium zinc oxide (IZO), zinc oxide (ZnO), or tin oxide (SnO) or an alloy thereof is(are) formed by a technique such as sputtering, and is patterned by photolithography.

Examples of the interlayer insulating film include an inorganic film of a substance such as silicon nitride or silicon oxide.

The alignment films 30 and 40 control the alignment of liquid crystal molecules with no voltage applied. In the present embodiment, the alignment films 30 and 40 are each a horizontal alignment film, which controls the alignment of the liquid crystal molecules with no voltage applied to be parallel to the first substrate 100 and the second substrate 200. Alternatively, the alignment films 30 and 40 each may be a vertical alignment film, which controls the alignment of the liquid crystal molecules in the direction perpendicular to the first substrate 100 and the second substrate 200. The alignment films 30 and 40 are each formed, for example, as follows: a liquid, highly fluid liquid crystal aligning agent in which a resin material such as polyimide resin is dissolved in a solvent is applied to the first substrate 100 or the second substrate 200 by a technique such as an ink-jet method, the solvent is removed by heating, and the resin material is baked.

The color material layer 221 is a color filter layer commonly used in the field of liquid crystal display devices and includes color filters of two or more colors. The color material layer 221 in the present embodiment includes a red color filter, a green color filter, and a blue color filter. It may further include a color filter of a different color such as a yellow color filter.

The black matrix layer 222 is a black matrix layer commonly used in the field of liquid crystal display devices and blocks external light or light from a backlight in the liquid crystal display device 1.

The overcoat layer 230 covers the color material layer 221 and the black matrix layer 222 to make the surface of the second substrate 200 flat. The overcoat layer 230 may be formed from any material. For example, it may be formed from a colorless transparent resin such as acrylic resin. The layer is formed by a technique such as spin coating or slit coating.

Each rib 250 reduces the wet-spread of the liquid crystal aligning agent. The rib 250 is a (protruding) ring-shaped blocking member formed in the frame region 20 to surround the display region 10. It is formed from an organic insulating film for a photo spacer that is disposed on the overcoat layer 230 and defines the distance between the first substrate 100 and the second substrate 200.

The liquid crystal layer 300 contains liquid crystal molecules. In the liquid crystal display device 1 of the present embodiment, voltage is applied to the liquid crystal layer 300 and the alignment state of the liquid crystal molecules is varied by changing the applied voltage. Thereby, the amount of light transmitted is controlled.

The sealing member 400 holds the liquid crystal layer 300 at a predetermined position. The sealing member 400 may be, for example, a photo initiator-containing acrylic/methacrylic resin or an epoxy resin containing an inorganic filler or an organic filler and a curing agent.

In the liquid crystal display device 1 of the present embodiment, the groove 150 in the first substrate 100 reduces display unevenness in an edge portion of the display region 10, and the forming position of the alignment film 30 is suitably adjusted. The following describes the specific function of the groove 150 in the present embodiment.

The groove 150 is formed in the transparent organic insulating film 120 and is disposed in a region that is shielded from light with the black matrix layer 222. The groove 150 has a first side wall 150A on the display region 10 side, a second side wall 150B on the side remote from the display region 10, and a bottom face 150C between the first side wall 150A and the second side wall 150B. The first side wall 150A and the second side wall 150B face each other with a gap in between. The first side wall 150A has a smaller inclination than the second side wall 150B. The groove 150 may be formed from any material. The first side wall 150A and the second side wall 150B are preferably formed from the transparent organic insulating film 120. The bottom face 150C may be formed from any material. For example, it may be formed from an inorganic insulating film on the insulating substrate 110, such as a silicon nitride (SiN) film, or a material of the insulating substrate 110, such as glass.

Since the first side wall 150A has a smaller inclination than the second side wall 150B in the groove 150, the surface tension at an upper edge 150D of the first side wall 150A is low, and the excess liquid crystal aligning agent easily flows into the groove 150 along the first side wall 150A when the liquid crystal aligning agent is applied to form the alignment film 30. Thereby, less excess liquid crystal aligning agent accumulates on the display region 10 side of the groove 150, and the unevenness of the thickness of the alignment film 30 can be reduced. Thus, the display unevenness (stain or luminance unevenness on part of the edge portion) can be reduced in an edge portion of the display region 10. Accordingly, the liquid crystal display device 1 has excellent display quality and reliability.

In the present embodiment, since the first side wall 150A has a smaller inclination than the second side wall 150B, that is, the second side wall 150B has a larger inclination than the first side wall 150A, the liquid crystal aligning agent flowing into the groove 150 does not easily spread out over the second side wall 150B due to the surface tension at an upper edge 150F of the second side wall 150B and can be prevented from flowing out toward the side remote from the display region 10. Thereby, the position of an edge of the alignment film 30 can be suitably adjusted, and the forming position of the alignment film 30 can be suitably adjusted.

When the alignment film is formed on a substrate using a highly fluid liquid crystal aligning agent and the edge of the alignment film cannot be formed at an suitable position, the liquid crystal aligning agent spreads to the peripheral edge of the frame region, which may cause overlap of the alignment film and the sealing member in the frame region. When it happens, due to low adhesion strength between the sealing member and the alignment film, which is lower than the adhesion strength, for example, between the sealing member and the transparent organic insulating film, a glass substrate, or an insulating substrate with a transparent conductive film, the adhesion strength between the substrate and the sealing member is reduced, resulting in reduction of the adhesion between the paired substrates.

In the present embodiment, since the groove 150 is disposed closer to the display region 10 than the sealing member 400, and the groove 150 allows the formation of the edge of the alignment film 30 closer to the display region 10 than the sealing member 400, a certain contact area can be obtained between the sealing member 400 and the first substrate 100, for example, between the sealing member 400 and the transparent organic insulating film 120, a glass substrate, or a transparent conductive film. Thus, the adhesion strength between the first substrate 100 and the second substrate 200 can be maintained. In other words, the groove 150 can prevent contact between the sealing member 400 and the alignment film 30 and can prevent reduction of the adhesion between the first substrate 100 and the second substrate 200. From this viewpoint, preferably, the whole edge of the alignment film 30 is closer to the display region 10 than the display region 10 side edge of the sealing member 400 and does not overlap the sealing member 400.

The first side wall 150A preferably has an average inclination angle of less than 50°, more preferably 40° or more and less than 45°, still more preferably 35° or more and less than 40°. When the first side wall 150A has an average inclination angle of less than 35°, the groove 150 has a large width, which may cause difficulty in achievement of the narrow frame. The second side wall 150B preferably has an average inclination angle of 60° or more and 90° or less, more preferably 70° or more and 90° or less, still more preferably 80° or more and 90° or less. The first side wall 150A and the second side wall 150B having the above-described average inclinations achieve the following effects. The surface tension at the upper edge 150D of the first side wall 150A is lower, and the excess liquid crystal aligning agent more easily flows into the groove 150 along the first side wall 150A. Thus, display unevenness can be further reduced in the edge portion of the display region 10. Further, the agent is more effectively blocked by the surface tension at the upper edge 150F of the second side wall 150B. Thus, the forming position of the alignment film 30 can be more suitably adjusted.

The difference between the average inclination angle of the first side wall 150A and the average inclination angle of the second side wall 150B is preferably 10° or more and 55° or less, more preferably 350 or more and 55° or less. Owing to such a structure, the excess liquid crystal aligning agent easily flows into the groove 150 along the first side wall 150A and is easily blocked at the second side wall 150B. Thereby, display unevenness can be further reduced in the edge portion of the display region 10, and the forming position of the alignment film 30 can be more suitably adjusted.

The term "average inclination angle of a side wall" herein means an integration average value. In other words, the average inclination angle of a side wall can be determined by averaging the angles of the tangents at local points on the side wall.

The first side wall 150A and the second side wall 150B each have a curved surface.

The groove 150 preferably has a bottom face 150C having a width of 10 μm or greater. In the below-described manufacturing method, the inclination of each side wall is formed by mask exposure during the formation of the groove 150. When the width of the bottom face 150C is less than 10 μm, a desired inclination may not be achieved during annealing, or in some cases, a space for accumulating the excess liquid crystal aligning agent may not be secured. On the other hand, in order to achieve a narrow frame, the width of the bottom face 150C of the groove 150 is preferably 100 μm or smaller.

The groove 150 preferably has a depth D of 1 μm or greater. In the below-described manufacturing method, the inclination of each side wall is formed by mask exposure during the formation of the groove 150. When the depth D of the groove 150 is less than 1 μm, a desired inclination may not be achieved during annealing, or in some cases, a space for accumulating the excess liquid crystal aligning agent may not be secured. The upper limit of the depth D of the groove 150 is not limited, and the depth D is preferably not larger than the upper limit of the thickness of the transparent organic insulating film 120. It is preferably 5 μm or smaller, more preferably 4 μm or smaller, still more preferably 3 μm or smaller.

Figure 18:
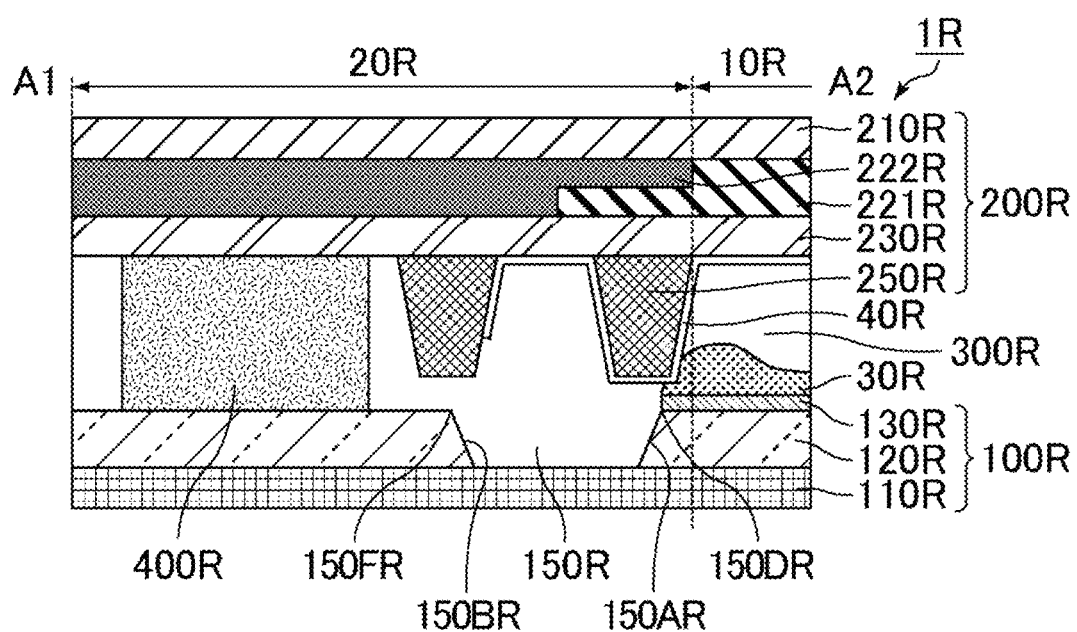
FIG. 18 is a schematic cross-sectional view of a portion in the vicinity of a frame region of a liquid crystal display device of Comparative Embodiment 2.

The following describes a liquid crystal display device of Comparative Embodiment 2 that is the same as the liquid crystal display device 1 of the present embodiment except for the shape of the groove 150. FIG. 18 is a schematic cross-sectional view of a portion in the vicinity of a frame region of a liquid crystal display device of Comparative Embodiment 2.

As shown in FIG. 18, a liquid crystal display device 1R of Comparative Embodiment 2 includes a display region 10R and a frame region 20R surrounding the display region 10R. The liquid crystal display device 1R of Comparative Embodiment 2 includes a first substrate 100R, a second substrate 200R facing the first substrate 100R, a liquid crystal layer 300R between the first substrate 100R and the second substrate 200R, and a ring-shaped sealing member 400R extending to surround the display region 10R.

The first substrate 100R includes, in the order towards the liquid crystal layer 300R, an insulating substrate 110R, a transparent organic insulating film 120R, a planar common electrode, an interlayer insulating film, and pixel electrodes 130R with slits. The transparent organic insulating film 120R includes the groove 150R in the frame region 20R.

The second substrate 200R includes, in the order towards the liquid crystal layer 300R, an insulating substrate 210R, a color material layer 221R, a black matrix layer 222R, and an overcoat layer 230R. The second substrate 200R further includes ribs 250R formed from a photo spacer material.

An alignment film 30R is disposed between the first substrate 100R and the liquid crystal layer 300R, and an alignment film 40R is disposed between the second substrate 200R and the liquid crystal layer 300R.

In the liquid crystal display device 1R of Comparative Embodiment 2, a first side wall 150AR and a second side wall 150BR in the groove 150R have the same inclination. When they both have a large inclination (e.g., 90°), the flow of the liquid crystal aligning agent spreading from the display region 10R side is blocked by the surface tension at an upper edge 150DR of the first side wall 150AR when the liquid crystal aligning agent is applied to form the alignment film 30R. The liquid crystal aligning agent that has nowhere to flow accumulates as a liquid pool in the display region 10R. Alternatively, in some cases, the liquid crystal aligning agent rebounds, for example, and accumulates more as a liquid pool on the display region 10R side. This leads to unevenness of the thickness of the alignment film 30R in an edge portion of the display region 10R, which is visible as display unevenness in the edge portion of the display region 10R. Thereby, the panel quality of the liquid crystal display device 1R may deteriorate.

When the first side wall 150AR and the second side wall 150BR in the groove 150R both have a small inclination (e.g., less than 50°), the surface tension at the upper edge 150DR of the first side wall 150AR is low, and the spread of the liquid crystal aligning agent cannot be blocked at the upper edge 150DR of the first side watt 150AR and the agent flows into the groove 150R. In this case, no liquid pool is formed on the display region 10R side. However, since the surface tension at an upper edge 150FR of the second side wall 150BR is low as well, the liquid crystal aligning agent spreads toward the sealing member 400R side over the second side wall 150BR, and the forming position of the alignment film 30R cannot be suitably adjusted.

In the present embodiment, the first side wall 150A has a smaller inclination than the second side wall 150B, whereby display unevenness can be reduced in the edge portion of the display region 10 and the forming position of the alignment film 30 can be suitably adjusted.

The groove 150 in the present embodiment has a shape in which the planar first side wall 150A and the flat second side wall 150B are each continuous with the flat bottom face 150C and has a trapezoidal cross-section perpendicular to the first substrate 100. The shape of the cross-section is not limited thereto.

Figure 4:
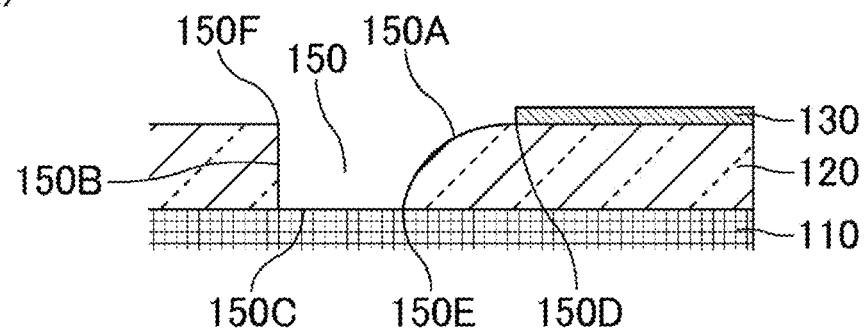
FIG. 4 includes views each showing the groove of the liquid crystal display device of Embodiment 1.
Figure 4:
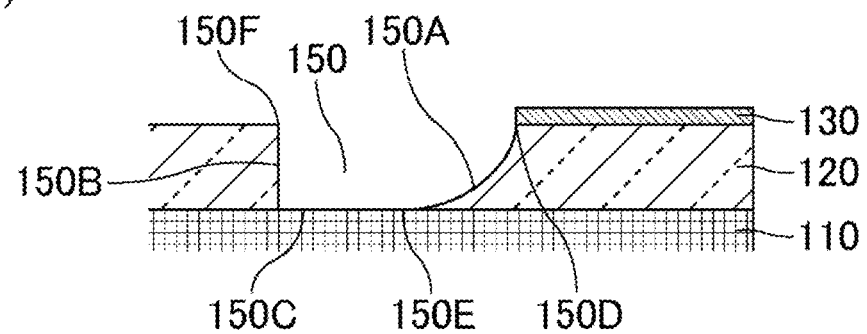

The first side wall 150A and the second side wall 150B each may be curved. FIG. 4 includes views each showing the groove of the liquid crystal display device of Embodiment 1: FIG. 4(a) is a schematic cross-sectional view of an exemplary groove 1 and FIG. 4(b) is a schematic cross-sectional view of an exemplary groove 2.

The first side wall 150A of the groove 150 in each of FIGS. 4(a) and 4(b) is curved. In the exemplary groove 1 shown in FIG. 4(a), the inclination of the first side wall 150A increases toward the lower edge 150E from the upper edge 150D. In the exemplary groove 2 shown in FIG. 4(b), the inclination of the first side wall 150A decreases toward the lower edge 150E from the upper edge 150D. Herein, the term "lower" indicates an insulating substrate side and the term "upper" indicates a side remote from the insulating substrate.

When the inclination of the first side wall 150A increases toward the lower edge 150E from the upper edge 150D as in the case of the exemplary groove 1 shown in FIG. 4(a), the surface tension at the upper edge 150D of the first side wall 150A is low, and the liquid crystal aligning agent easily enters the groove 150 from the display region 10 side. Further, the liquid crystal aligning agent easily flows into the groove 150 as it comes close to the lower edge 150E of the first side wall 150A. As a result, the liquid crystal aligning agent further smoothly flows into the groove 150, hardly causing display unevenness in the edge portion of the display region 10.

On the other hand, when the inclination of the first side wall 150A decreases toward the lower edge 150E from the upper edge 150D as in the case of the exemplary groove 2 shown in FIG. 4(b), the surface tension at the upper edge 150D is high, and the liquid crystal aligning agent spreading from the display region 10 side further hardly flows into the groove 150.

Accordingly, in order to reduce display unevenness in the edge portion of the display region 10, the exemplary groove 1 as described above, that is, the structure in which the inclination of the first side wall 150A increases toward the lower edge 150E from the upper edge 150D is preferred.

Figure 5:
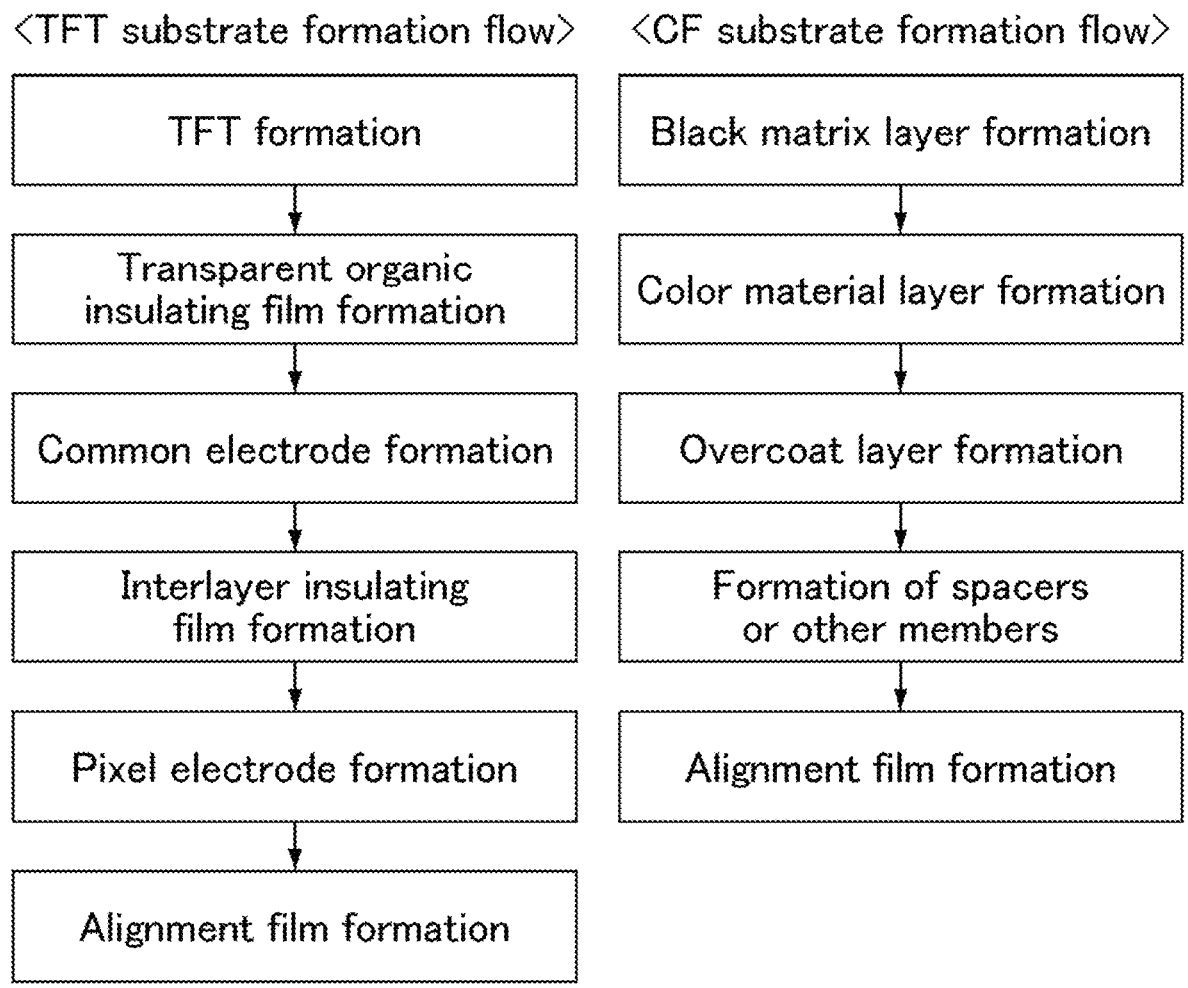
FIG. 5 is a flow chart of the steps of manufacturing the liquid crystal display device of Embodiment 1.

The following describes a method for manufacturing the liquid crystal display device 1 of the present embodiment. FIG. 5 is a flow chart of the steps of manufacturing the liquid crystal display device of Embodiment 1. The first substrate 100 which is a TFT substrate and the second substrate 200 which is a CF substrate can be manufactured by known manufacturing techniques as described below.

The first substrate 100 and the alignment film 30 can be manufactured according to "TFT substrate formation flow" shown in FIG. 5. Specifically, it can be manufactured by the series of steps of TFT formation, transparent organic insulating film formation, common electrode formation, interlayer insulating film formation, pixel electrode formation, and alignment film formation. The following specifically describes these steps.

In the TFT formation, scanning lines, data lines, and TFTs are formed on the insulating substrate 110. The materials of scanning lines, data lines, and TFTs each including a thin film semiconductor, a gate electrode constituted by part of the corresponding scanning line, a source electrode constituted by part of the corresponding data line, and a drain electrode connected to a corresponding pixel electrode are each formed by a technique such as sputtering or chemical vapor deposition (CVD) and patterned by a technique such as photolithography in a desired pattern.

In the transparent organic insulating film formation, a photosensitive resin composition (positive photoresist) as a material of a transparent organic insulating film is applied to the scanning lines, the data lines, and the TFTs by a technique such as spin coating or slit coating to form a photosensitive resin layer. The photosensitive resin layer is patterned by direct exposure through a photomask and developed to form a pattern of the groove 150. Subsequently, the workpiece is annealed to form the transparent organic insulating film 120 including the groove 150.

The first side wall 150A having a small inclination can be formed by halftone exposing the photosensitive resin layer with a reduced exposure amount. The second side wall 150B having a larger inclination than the first side wall 150A can be formed by exposing the photosensitive resin layer using the principle of a conventional binary mask.

In the common electrode formation following the transparent organic insulating film formation, a transparent conductive film is formed on the transparent organic insulating film 120 using any of the above-described materials for the common electrode by a technique such as sputtering and is patterned to form the common electrode in a desired pattern that fits the structure within the display region 10 and the structure of the groove 150.

In the interlayer insulating film formation, an inorganic insulating film such as a silicon nitride film or a silicon oxide film is formed on the common electrode by a technique such as CVD and is patterned to form an interlayer insulating film in a desired pattern that fits the structure within the display region 10 and the structure of the groove 150.

In the pixel electrode formation, a transparent conductive film is formed on the interlayer insulating film using any of the above-described materials for the pixel electrode 130 by a technique such as sputtering and is patterned to form the pixel electrode 130 in a comb-like slit pattern in the display region 10. Thus, the first substrate 100 which is a TFT substrate can be manufactured.

In the alignment film formation after the patterning of the pixel electrode 130, the liquid crystal aligning agent is applied by an ink-jet method to form a coating, and after removal of a solvent therefrom, the coating is imidized by baking and subjected to rubbing or photo-alignment treatment to impart an alignment-controlling force to the coating for aligning liquid crystal molecules in a particular direction. Thus, the alignment film 30 is formed on the first substrate 100. The liquid crystal aligning agent may be applied by roll coating.

The second substrate 200 and the alignment film 40 can be manufactured according to "CF substrate formation flow" shown in FIG. 5. Specifically, it can be manufactured by the series of steps of black matrix layer formation, color material layer formation, overcoat layer formation, formation of spacers or other members, and alignment film formation. The following specifically describes these steps.

In the black matrix layer formation, the black matrix layer 222 is formed and patterned by a technique such as photolithography in a desired matrix.

In the color material layer formation, red R, green G, and blue B resist materials are sequentially formed by a technique such as spin coating or slit coating and are each patterned by a technique such as photolithography to form the color material layer 221.

In the overcoat layer formation, the overcoat layer 230 formed from a transparent organic insulating film is formed on the color material layer 221 and the black matrix layer 222 by a technique such as spin coating or slit coating.

In the formation of spacers or other members, a transparent organic insulating film material is formed on the overcoat layer 230 by a technique such as spin coating or slit coating and is patterned to form photo spacers at desired positions (mainly in the display region 10) and frame-like protruding ribs 250 in a region surrounding the display region 10. Thus, the second substrate 200 which is a CF substrate can be manufactured.

In the alignment film formation, a liquid crystal aligning agent is applied by an ink-jet method to form a coating, and the coating is imidized by baking and subjected to rubbing or photo-alignment treatment to impart an alignment-controlling force to the coating for aligning liquid crystal molecules in a particular direction. Thus, the alignment film 40 is formed on the second substrate 200. The liquid crystal aligning agent may be applied by roll coating.

To the thus manufactured first substrate 100 or second substrate 200 is applied a sealant, the liquid crystal layer 300 is formed in a region surrounded by the sealant, and the first substrate 100 and the second substrate 200 are assembled to each other with the sealant. Thereby, the liquid crystal display device 1 of the present embodiment can be manufactured. The liquid crystal layer 300 may be formed in the region surrounded by the sealant after assembling the first substrate 100 and the second substrate 200. Specifically, an inlet is formed in a seal drawing pattern, and liquid crystal is injected from the inlet by vacuum injection in a vacuum chamber.

Embodiment 2

In the present embodiment, features unique to the present embodiment are mainly described, and the same features as those in the above embodiment are not described again. A liquid crystal display device of the present embodiment has the same configuration as the liquid crystal display device 1 of Embodiment 1, except that the groove partly overlaps the sealing member.

Figure 6:
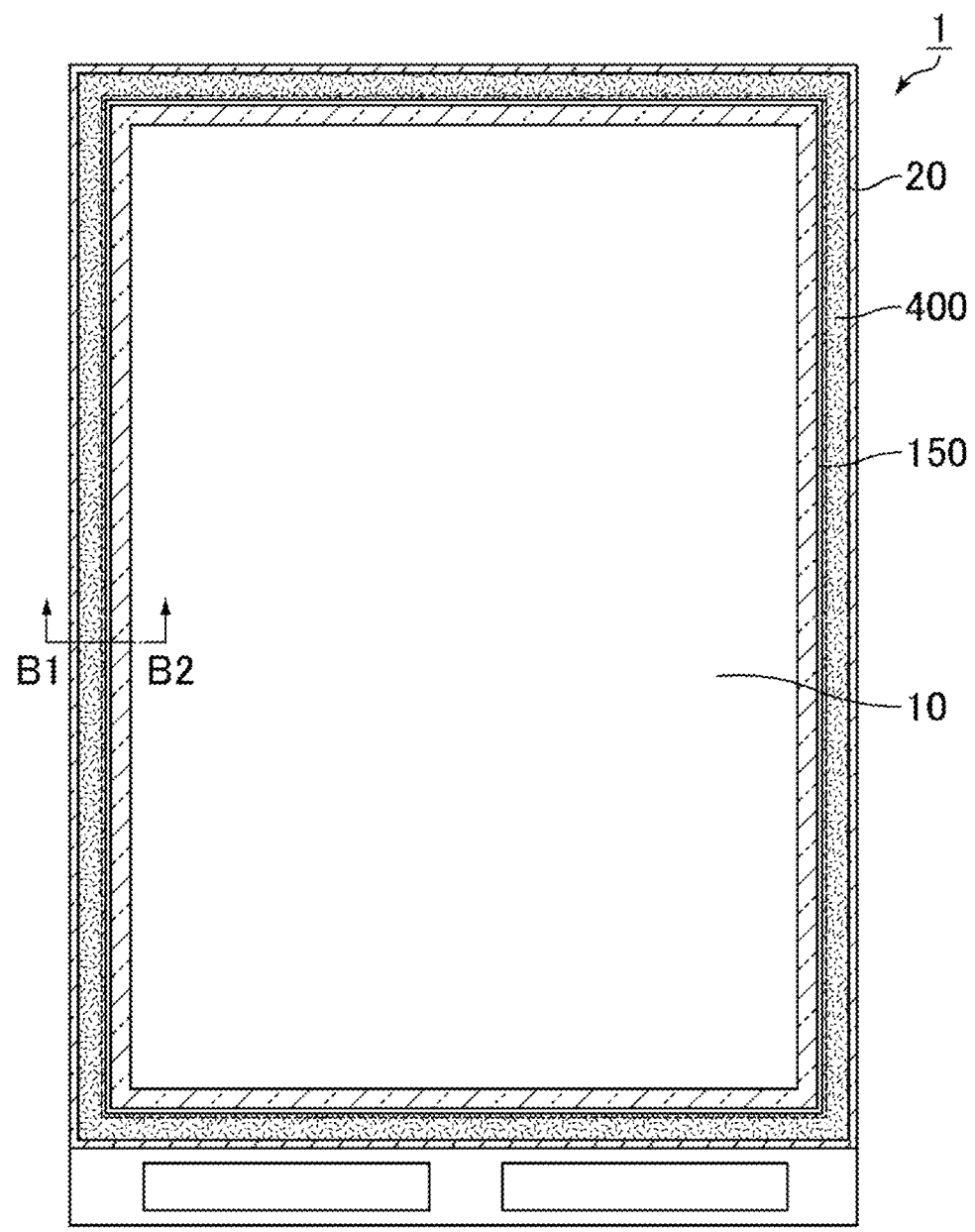
FIG. 6 is a schematic plan view of a liquid crystal display device of Embodiment 2.
Figure 7:
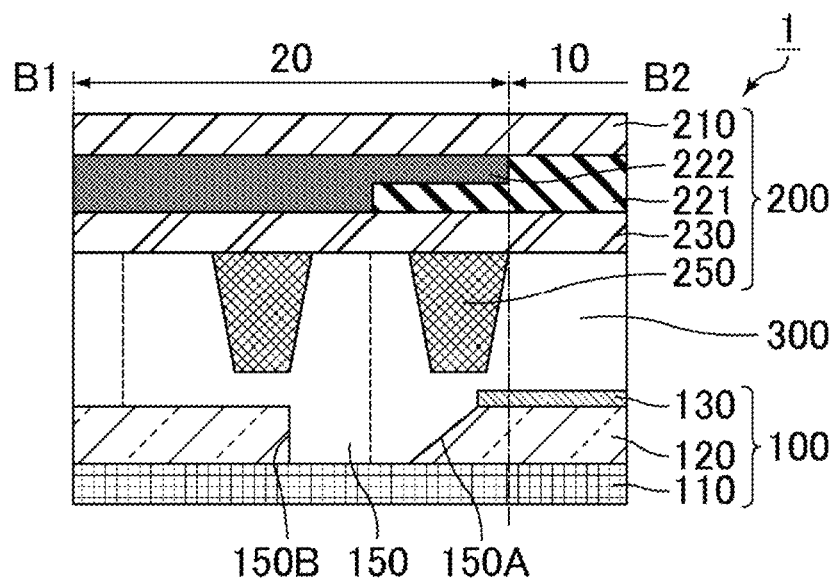
FIG. 7 is a schematic cross-sectional view of the liquid crystal display device of Embodiment 2 before formation of an alignment film and a sealing member.
Figure 8:
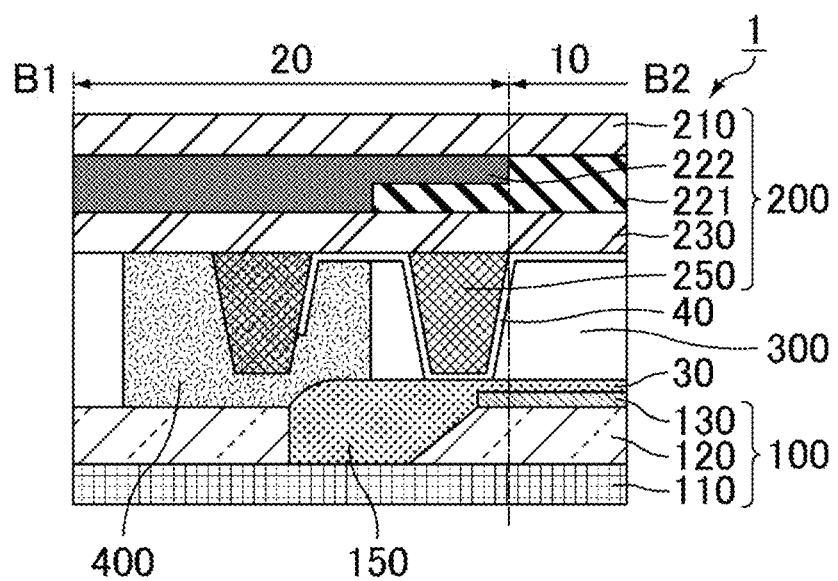
FIG. 8 is a schematic cross-sectional view of a portion in the vicinity of a frame region of the liquid crystal display device of Embodiment 2.

FIG. 6 is a schematic plan view of a liquid crystal display device of Embodiment 2. FIG. 7 is a schematic cross-sectional view of the liquid crystal display device of Embodiment 2 before formation of an alignment film and a sealing member. FIG. 8 is a schematic cross-sectional view of a portion in the vicinity of a frame region of the liquid crystal display device of Embodiment 2. FIG. 7 and FIG. 8 each illustrate a cross section taken along the line B1-B2 in FIG. 6. In FIG. 7, a space between the dashed lines indicates a position where the sealing member 400 is to be formed using a sealant.

As shown in FIG. 6 to FIG. 8, a liquid crystal display device 1 of the present embodiment includes the display region 10 and the frame region 20 surrounding the display region 10. In the frame region 20 in a plan view, the ring-shaped groove 150 extending to surround the display region 10 and the ring-shaped sealing member 400 extending to surround the display region 10 are formed. The display region 10 side edge of the groove 150 is closer to the display region 10 than the display region 10 side edge of the sealing member 400, and the groove 150 partly overlaps the sealing member 400.

Such a structure enables elimination of a gap between the alignment film 30 and the sealing member 400, whereby a narrower frame can be achieved. On the other hand, as described in Embodiment 1, in terms of the adhesion with the sealing member 400, an overlap area between the alignment film 30 and the sealing member 400 needs to more reliably control. If the overlap area between the alignment film 30 and the sealing member 400 is too large, the contact area between the sealing member 400 and the first substrate 100 (e.g., between the sealing member 400 and the transparent organic insulating film 120, a glass substrate, or a transparent conductive film) decreases, causing difficulty in achieving desired adhesion (adhesion strength). This may result in separation of the first substrate 100 from the second substrate 200. Accordingly, suitable adjustment of the forming position of the alignment film 30 is very important.

Figure 22:
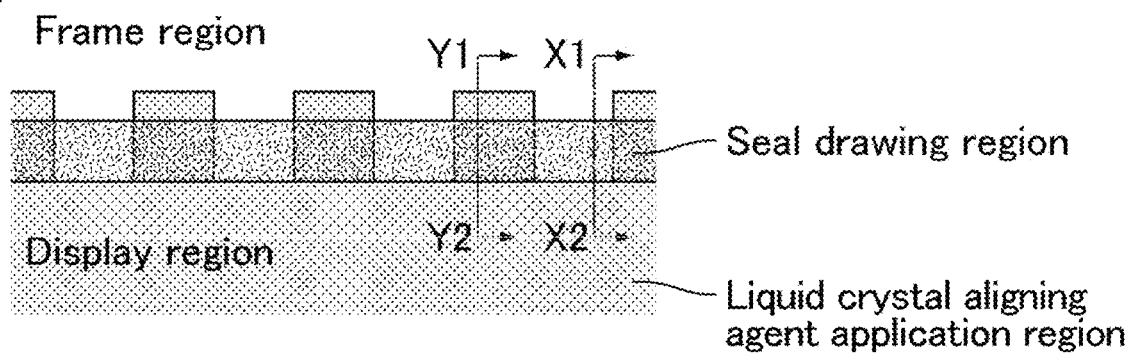
FIG. 22 includes views each showing a seal drawing region and a liquid crystal aligning agent application region of a liquid crystal display device.
Figure 22:
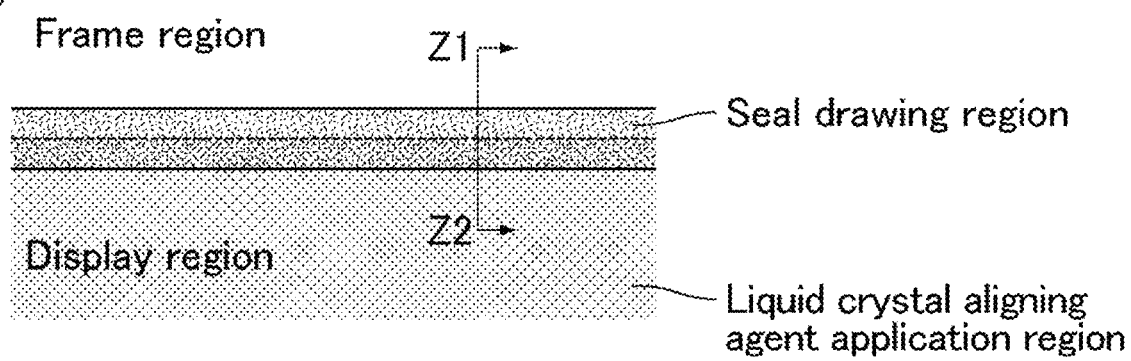
Figure 23:
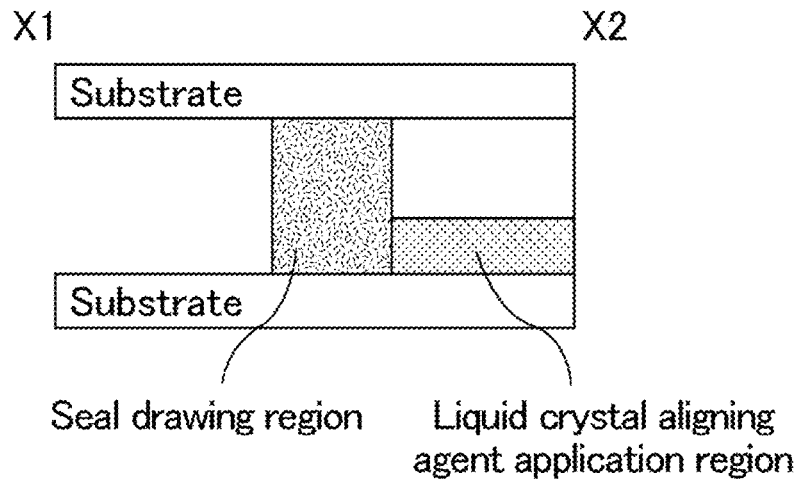
FIG. 23 includes views each showing a seal drawing region and a liquid crystal aligning agent application region of a liquid crystal display device.
Figure 23:
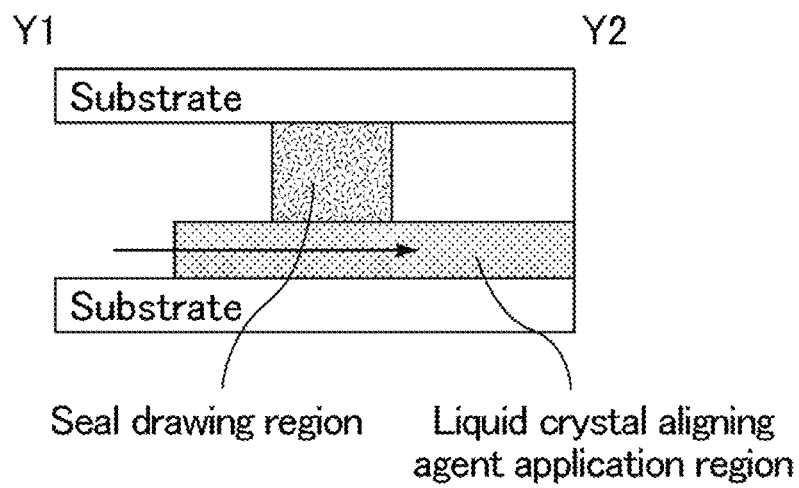
Figure 23:
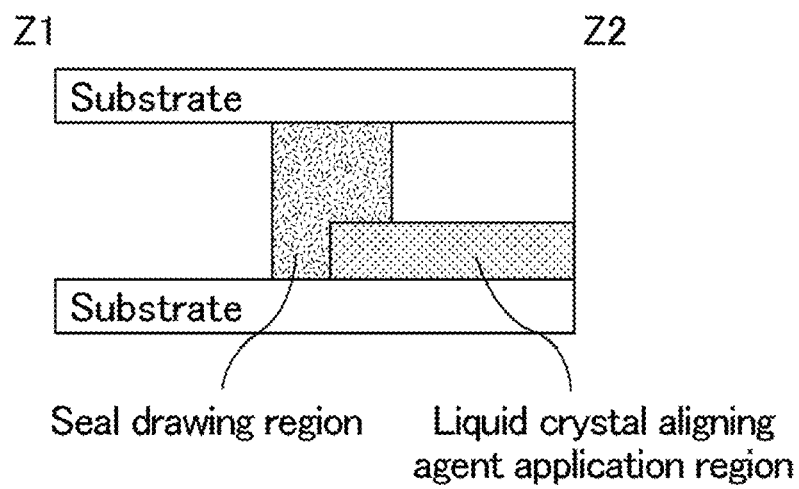

The suitable adjustment of the forming position of the alignment film 30 is important from the following point of view as well. FIG. 22 includes views each showing a seal drawing region and a liquid crystal aligning agent application region of a liquid crystal display device: FIG. 22(a) is a schematic plan view of an exemplary liquid crystal display device 1 where an edge of the liquid crystal aligning agent application region is nonlinear and wavy and FIG. 22(b) is a schematic plan view of an exemplary liquid crystal display device 2 where an edge of the liquid crystal aligning agent application region is linear. FIG. 23 includes views each showing a seal drawing region and a liquid crystal aligning agent application region of a liquid crystal display device: FIG. 23(a) is a schematic cross-sectional view taken along the line X1-X2 in FIG. 22(a), FIG. 23(b) is a schematic cross-sectional view taken along the line Y1-Y2 in FIG. 22(a), and FIG. 23(c) is a schematic cross-sectional view taken along the line Z1-Z2 in FIG. 22(b). In FIG. 22 and FIG. 23, the seal drawing region refers to a region where the sealing member is to be formed, and the liquid crystal aligning agent application region refers to a region where the alignment film is to be formed.

In both the exemplary liquid crystal display device 1 and the exemplary liquid crystal display device 2 shown in FIG. 22, 50% of the area of the seal drawing region overlaps the liquid crystal aligning agent application region. In other words, the contact area between the sealing member and the alignment film in each of the exemplary liquid crystal display devices 1 and 2 is equal to 50% of the area of the sealing member. Thus, the exemplary liquid crystal display device 1 and the exemplary liquid crystal display device 2 have no great difference in adhesion strength between the substrates.

Focusing on the position where the alignment film is to be formed in FIG. 23(a) and FIG. 23(c), the edge of the liquid crystal aligning agent application region is closer to the display region than the edge of the seal drawing region close to the edge of the liquid crystal panel, and the seal member shields the alignment film from the atmosphere outside the liquid crystal panel. On the other hand, in FIG. 23(b), the edge of the liquid crystal aligning agent application region is closer to the edge of the liquid crystal panel than the edge of the seal drawing region close to the edge of the liquid crystal panel, and the alignment film is exposed to the atmosphere outside the liquid crystal panel. Therefore, the alignment film in the exemplary liquid crystal, display device 1 is affected by external disturbance factors such as moisture absorption from a direction indicated by the arrow in FIG. 23(b). This may cause display unevenness in the periphery of the liquid crystal panel. Thus, the excessive spread of the alignment film under the sealing member may cause display unevenness in the periphery of the panel as well as the reduction in the adhesion strength between the substrates. Although the edge of the alignment film may not need to be tightly adjusted in the exemplary liquid crystal display device 1 and the exemplary liquid crystal display device 1 has the same sealing adhesion strength as the exemplary liquid crystal display device 2, the exemplary liquid crystal display device 1 is not preferred for the above reason. On the other hand, in the exemplary liquid crystal display device 2, the edge of the alignment film needs to be reliably adjusted within the width of the seal drawing region. Accordingly, suitable adjustment of the forming position of the alignment film is very important in terms of display unevenness as well as the adhesion strength between the substrates.

In the present embodiment, the groove 150 enables suitable control of the position of the edge of the alignment film 30, whereby display unevenness in the periphery of the panel caused by external disturbance factors such as moisture absorption can be effectively reduced. From this viewpoint, preferably, the whole edge of the alignment film 30 is closer to the display region 10 than the edge on the side remote from the display region 10 of the sealing member 400 and overlaps the sealing member 400.

Figure 19:
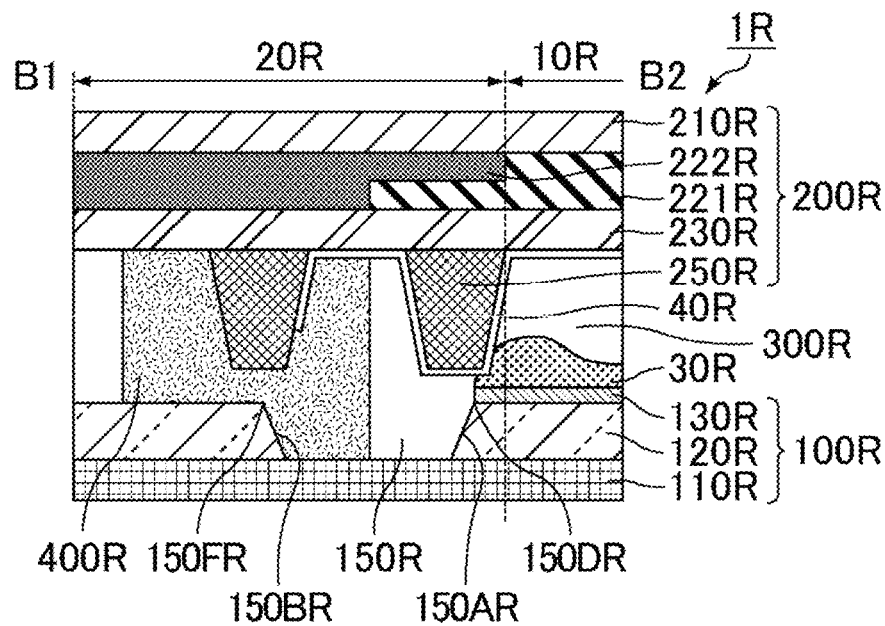
FIG. 19 is a schematic cross-sectional view of a portion in the vicinity of a frame region of a liquid crystal display device of Comparative Embodiment 3.

A liquid crystal display device of Comparative Embodiment 3 that is the same as the liquid crystal display device 1 of the present embodiment except for the structure of the groove 150 will be studied. FIG. 19 is a schematic cross-sectional view of a portion in the vicinity of a frame region of the liquid crystal display device of Comparative Embodiment 3. As shown in FIG. 19, the first side wall 150AR and the second side wall 150BR of the groove 150R in a liquid crystal display device 1R of Comparative Embodiment 3 have the same inclination as in the case of the groove 150R in the liquid crystal display device 1R of Comparative Embodiment 2. When they both have a large inclination, the liquid crystal aligning agent accumulates on the display region 10R side due to the surface tension at an upper edge 150DR of the first side wall 150AR as in the case of Comparative Embodiment 2, and unevenness of the thickness of the alignment film 30R occurs in the edge portion of the display region 10R. This leads to display unevenness visible in the edge portion of the display region 10R. When the first side wall 150AR and the second side wall 150BR of the groove 150R both have a small inclination (e.g., less than 50°), the surface tension at the upper edge 150FR of the second side wall 150BR is low, and the forming position of the alignment film 30R cannot be suitably adjusted. In this case, the overlap area between the alignment film 30R and the sealing member 400R is too large, and the contact area between the sealing member 400R and the first substrate 100R (e.g., between the sealing member 400R and the transparent organic insulating film 120R, the glass substrate, or the transparent conductive film) decreases. Thus, a specified adhesion strength or more cannot be maintained to cause separation between the first substrate 100R and the second substrate 200R.

On the other hand, in the present embodiment, since the first side wall 150A has a smaller inclination than the second side wall 150B as in the case of Embodiment 1, display unevenness can be reduced in the edge portion of the display region 10 and the forming position of the alignment film 30 can be suitably adjusted. As a result, a desired overlap area between the alignment film 30 and the sealing member 400 can be obtained, and a specified seal adhesion strength or more can be maintained.

Embodiment 3

In the present embodiment, features unique to the present embodiment are mainly described, and the same features as those in the above embodiments are not described again. A liquid crystal display device of the present embodiment has the same configuration as in the liquid crystal display device 1 of Embodiment 2, except that the liquid crystal display device of the present embodiment includes multiple grooves.

Figure 9:
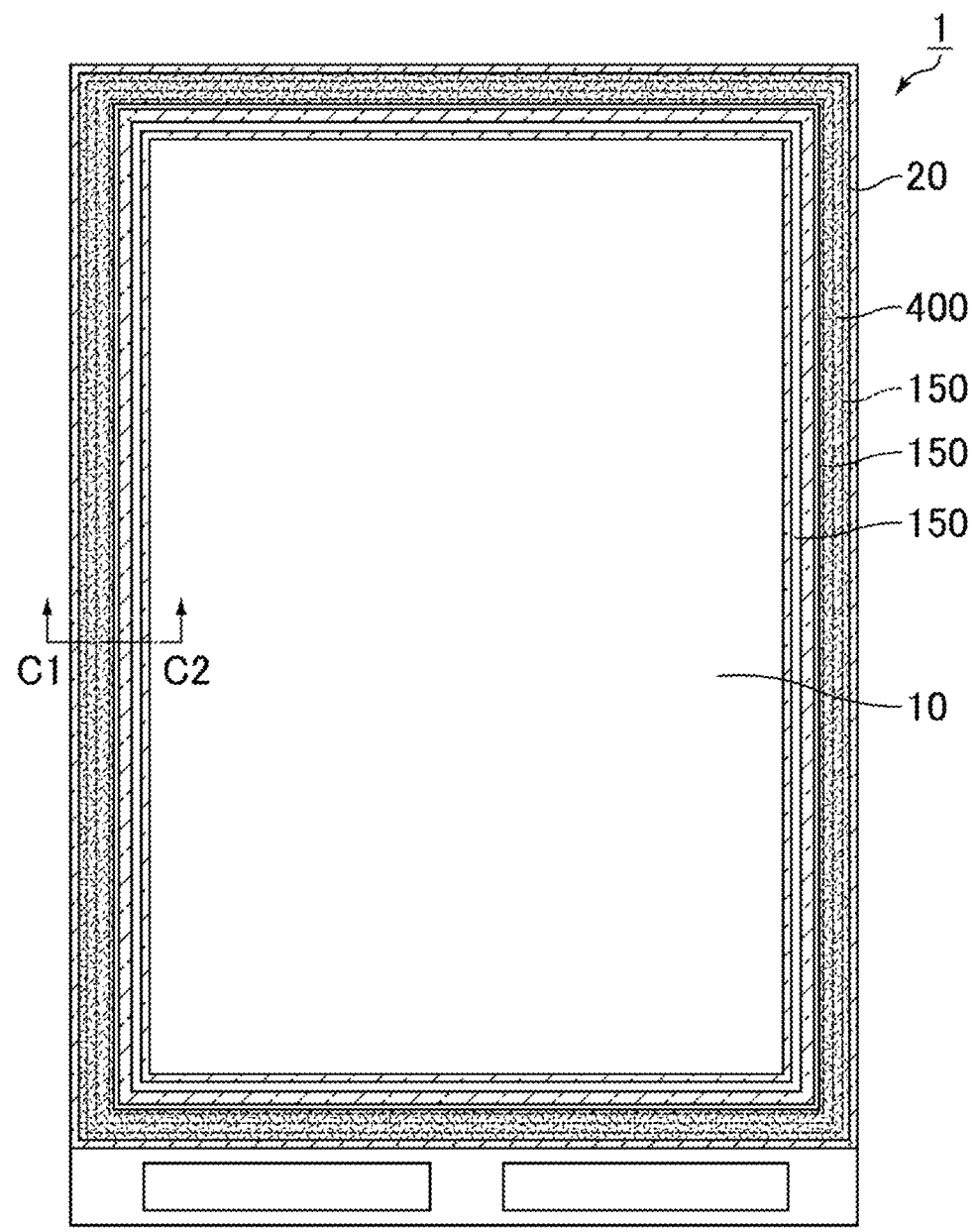
FIG. 9 is a schematic plan view of a liquid crystal display device of Embodiment 3.
Figure 10:
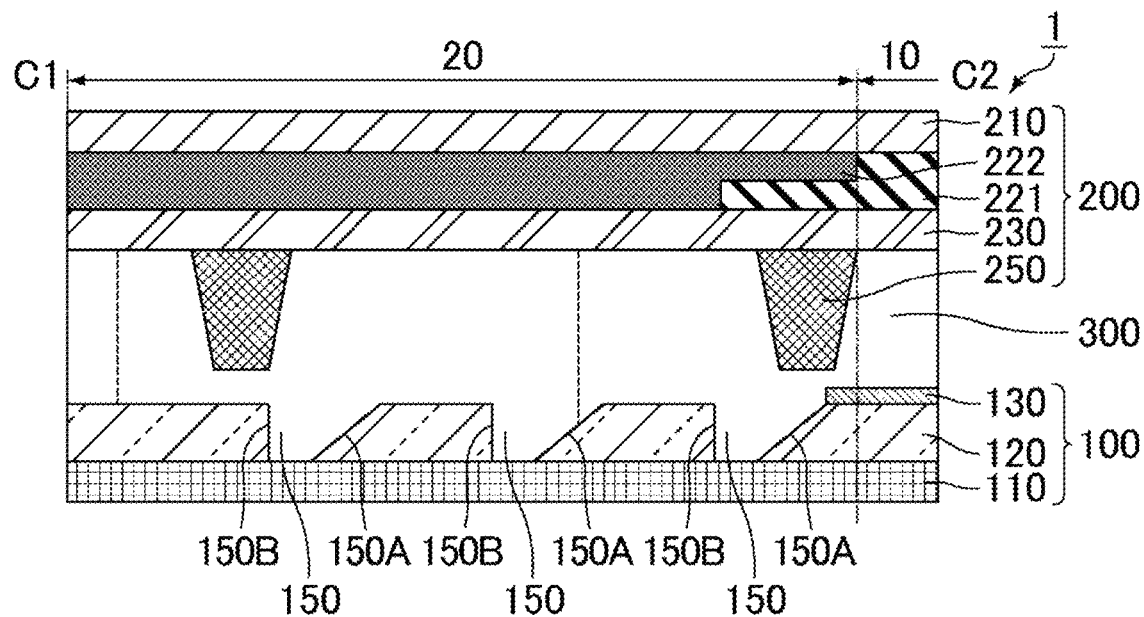
FIG. 10 is a schematic cross-sectional view of the liquid crystal display device of Embodiment 3 before formation of an alignment film and a sealing member.
Figure 11:
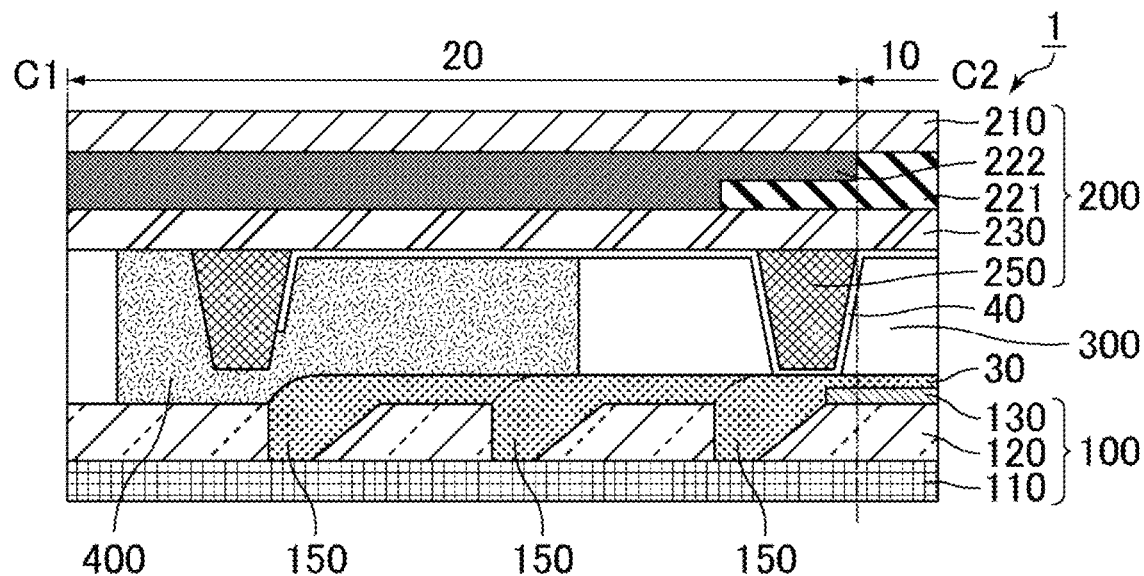
FIG. 11 is a schematic cross-sectional view of a portion in the vicinity of a frame region of the liquid crystal display device of Embodiment 3.

FIG. 9 is a schematic plan view of a liquid crystal display device of Embodiment 3. FIG. 10 is a schematic cross-sectional view of the liquid crystal display device of Embodiment 3 before formation of an alignment film and a sealing member. FIG. 11 is a schematic cross-sectional view of a portion in the vicinity of a frame region of the liquid crystal display device of Embodiment 3. FIG. 10 and FIG. 11 each illustrate a cross section taken along the line C1-C2 in FIG. 9. In FIG. 10, a space between the dashed lines indicates a position where the sealing member 400 is to be formed using a sealant.

As shown in FIG. 9 to FIG. 11, the liquid crystal display device 1 of the present embodiment includes the display region 10, the frame region 20 surrounding the display region 10. In the frame region 20 in a plan view, the ring-shaped grooves 150 (e.g., three grooves) extending to surround the display region 10, the ring-shaped sealing member 400 extending to surround the display region 10 are formed. The groove 150 closest to the display region 10 among the grooves 150 is disposed closer to the display region 10 than the sealing member 400 and the other grooves each at least partly overlap the sealing member 400.

There are two major methods for applying the liquid crystal aligning agent to form an alignment film, one is a roll coating method using a flexographic plate, and the other is an ink-jet method in which an ink is shot through a nozzle. The ink-jet method is more advantageous than the roll coating method in that it enables application of the liquid crystal aligning agent with higher position accuracy and enables less consumption of the liquid crystal aligning agent. Thus, it is suitable to achieve high definition and a narrow frame. Meanwhile, the ink-jet method is more disadvantageous than the roll coating method in that the liquid crystal aligning agent for the ink-jet method is less viscous and easily flows, and thus, the film thickness stability and edge accuracy of the peripheral edge of the alignment film are difficult to obtain. Also, in some cases, the peripheral edge of the alignment film is not linear and has a wave profile having waves with widths of several tens of micrometers to a hundred and several tens of micrometers. The region where the thickness of the peripheral edge of the alignment film is not uniform is also referred to as a halo region.

The liquid crystal display device 1 of the present embodiment includes a plurality of the same grooves 150 as that in Embodiment 1. These grooves 150 block the liquid crystal aligning agent in multiple steps, allowing more suitable adjustment of the forming position of the alignment film 30. Thus, for example, even when the liquid crystal aligning agent is less viscous, the forming position of the alignment film 30 can be suitably adjusted. At least one of the grooves 150 may have a different shape and/or a different size from the other grooves 150.

Figure 20:
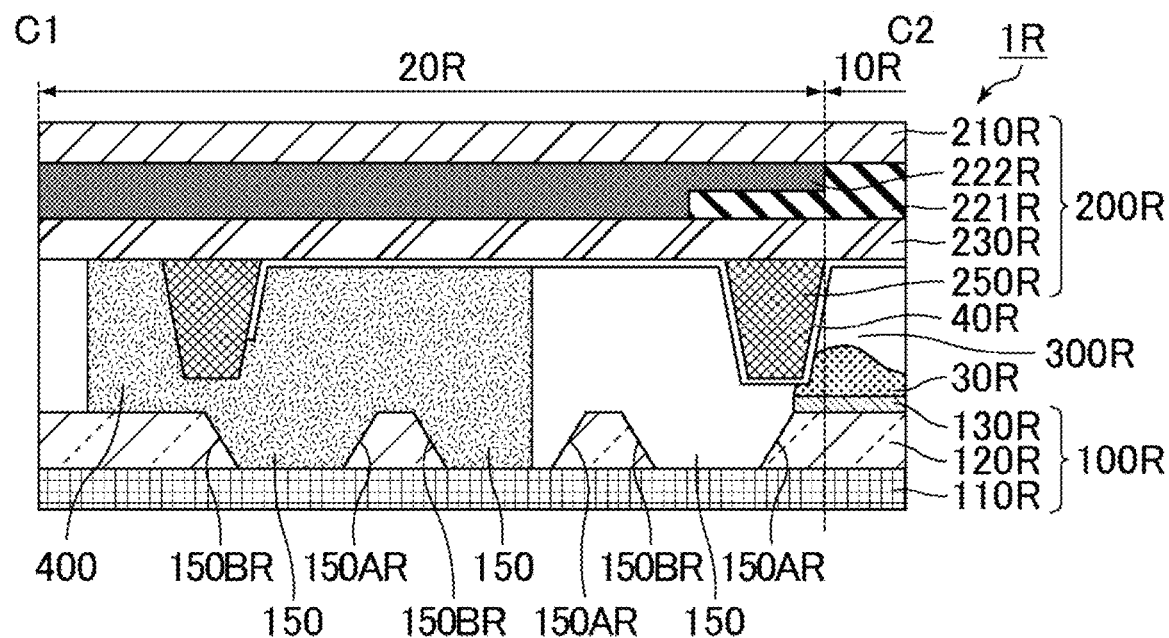
FIG. 20 is a schematic cross-sectional view of a portion in the vicinity of a frame region of a liquid crystal display device of Comparative Embodiment 4.

A liquid crystal display device of Comparative Embodiment 4 that is the same as the liquid crystal display device 1 of the present embodiment except for the structure of the groove 150 will be studied. FIG. 20 is a schematic cross-sectional view of a portion in the vicinity of a frame region of a liquid crystal display device of Comparative Embodiment 4. As shown in FIG. 20, the first side wall 150AR and the second side wall 150BR of the groove 150R in a liquid crystal display device 1R of Comparative Embodiment 4 have the same inclination as in the case of the groove 150R in the liquid crystal display device 1R of Comparative Embodiment 2. When they both have a large inclination, the liquid crystal aligning agent accumulates on the display region 10R side due to the surface tension at an upper edge 150DR of the first side wall 150AR as in the case of Comparative Embodiment 2, and unevenness of the thickness of the alignment film 30R occurs in the edge portion of the display region 10R. This leads to display unevenness visible in the edge portion of the display region 10R. When the first side wall 150AR and the second side wall 150BR of the groove 150R both have a small inclination (e.g., less than 50°), the surface tension at the upper edge 150FR of the second side wall 150BR is low, and the forming position of the alignment film 30R cannot be suitably adjusted. In this case, the overlap area between the alignment film 30R and the sealing member 400R is too large, and the contact area between the sealing member 400R and the first substrate 100R (e.g., between the sealing member 400R and the transparent organic insulating film 120R, the glass substrate, or the transparent conductive film) decreases. Thus, a specified adhesion strength or more cannot be maintained to cause separation between the first substrate 100R and the second substrate 200R.

On the other hand, in the present embodiment, since the first side wall 150A has a smaller inclination than the second side wall 150B as in the case of Embodiment 1, display unevenness can be reduced in the edge portion of the display region 10 and the forming position of the alignment film 30 can be suitably adjusted. As a result, a desired overlap area between the alignment film 30 and the sealing member 400 can be obtained, and a specified seal adhesion strength or more can be maintained.

In the present embodiment, the distance between two adjacent grooves 150 is preferably 10 µm or greater and 100 µm or smaller. When the distance between the grooves 150 is less than 10 µm, the upper edges of the side walls of the adjacent grooves may be joined to each other during annealing in the above manufacturing method, which may cause difficulty in controlling the surface tension at the upper edges. On the other hand, in order to achieve a narrow frame, the distance between two adjacent grooves 150 is preferably 100 µm or smaller.

Embodiment 4

In the present embodiment, features unique to the present embodiment are mainly described, and the same features as those in the above embodiment are not described again. A liquid crystal display device of the present embodiment has the same configuration as in the liquid crystal display device 1 of Embodiment 3, except that the groove closest to the display region has a different shape from the other grooves.

Figure 12:
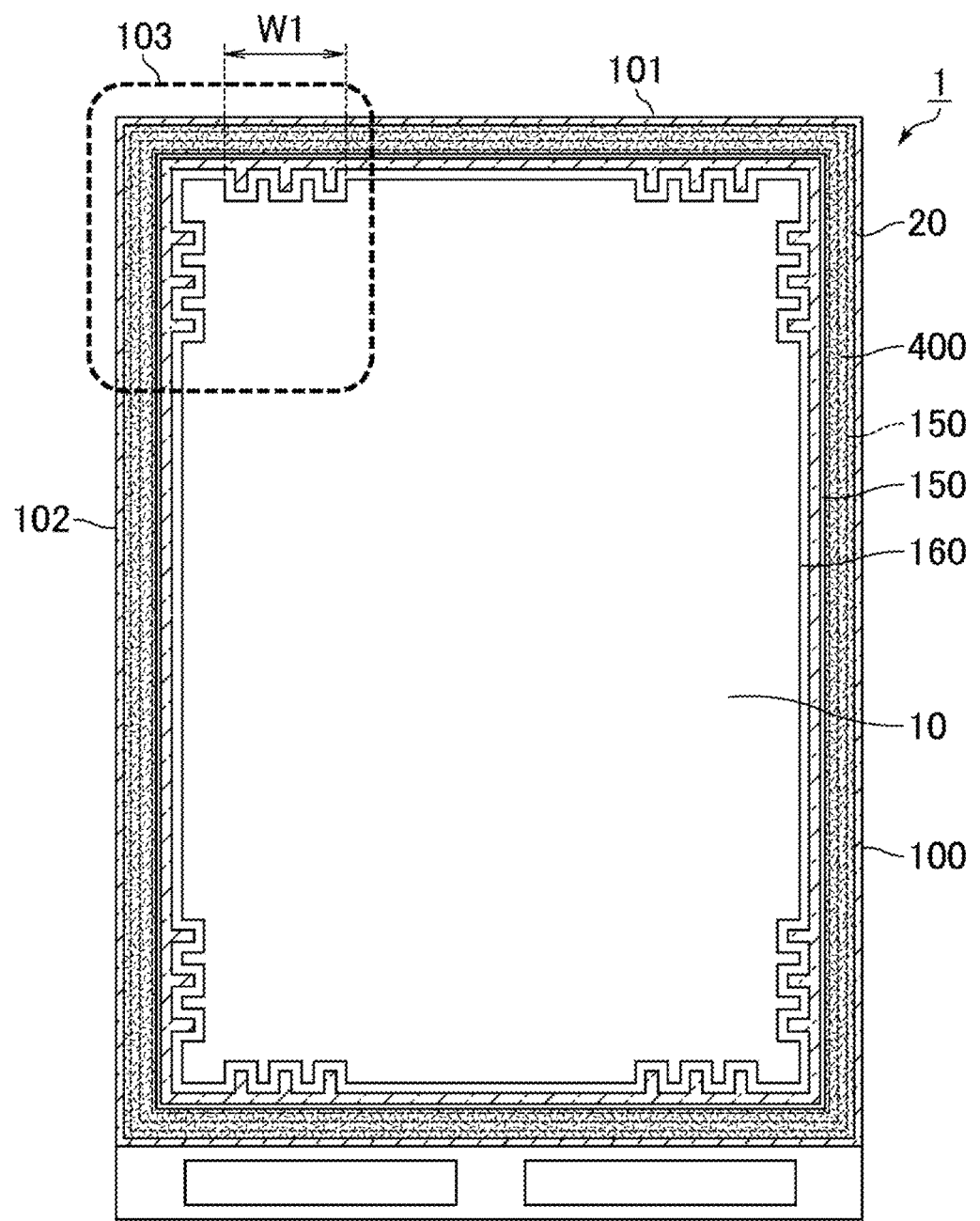
FIG. 12 is a schematic plan view of a liquid crystal display device of Embodiment 4.
Figure 13:
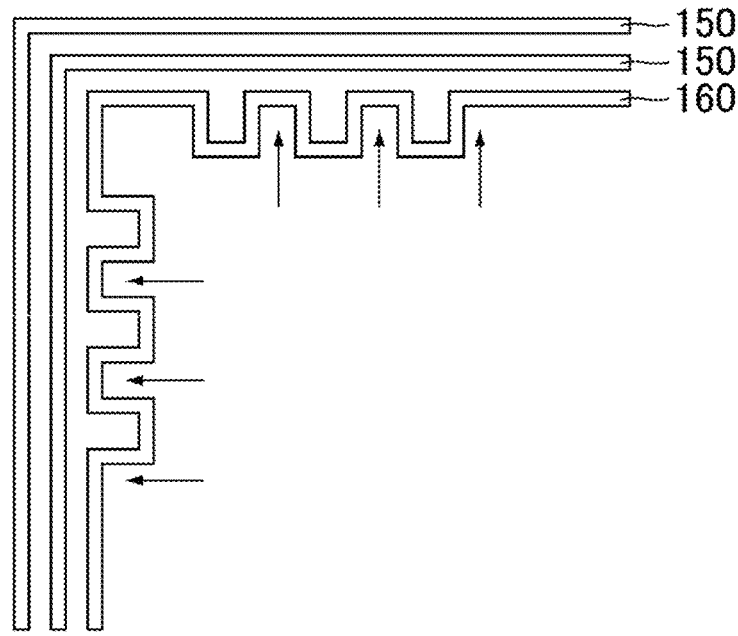
FIG. 13 is a schematic plan view of a corner of the liquid crystal display device of Embodiment 4.

FIG. 12 is a schematic plan view of a liquid crystal display device of Embodiment 4. FIG. 13 is a schematic plan view of a corner of the liquid crystal display device of Embodiment 4. The arrows in FIG. 13 indicate the flow of the liquid crystal aligning agent.

As shown in FIG. 12, the liquid crystal display device 1 of the present embodiment includes the display region 10 and the frame region 20 surrounding the display region 10. In the frame region 20 in a plan view, one or more ring-shaped grooves extending to surround the display region 10 (e.g., two first grooves 150 and a second groove 160 having a different structure from the first grooves) and the ring-shaped sealing member 400 extending to surround the display region 10 are formed. The first grooves 150 at least partly overlap the sealing member 400. The second groove 160 is formed in the first substrate 100 as in the case of the first grooves 150.

The first substrate 100 has a rectangular shape containing four corners 103 which are each formed by a first side 101 and a second side 102. The second groove 160 in the first substrate 100 in a plan view is disposed between the first groove 150 and the display region 10 and extends to surround the display region 10. The second groove 160 in a plan view includes an uneven portion at each corner 103 in the first substrate 100.

Figure 21:
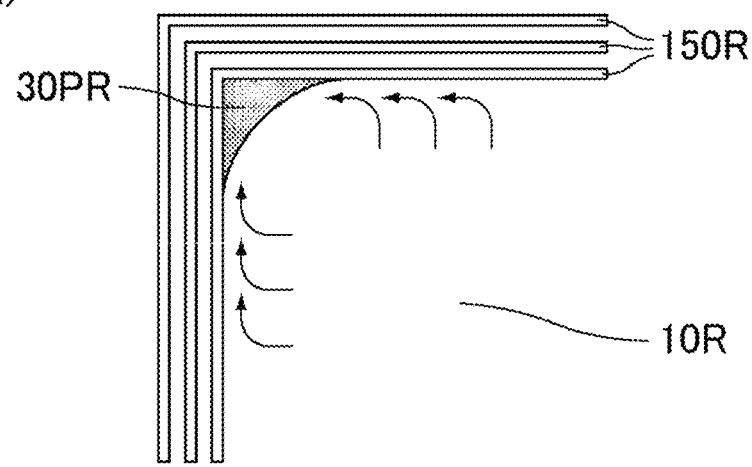
FIG. 21 includes schematic plan views each showing a corner of the liquid crystal display device of Comparative Embodiment 4.
Figure 21:
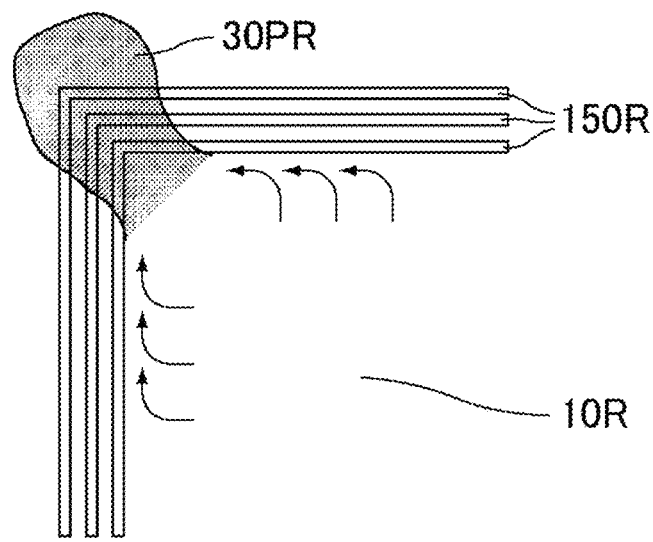

Comparative Embodiment 4 that is the same as the present embodiment except for the structure of the grooves will be studied. FIG. 21 includes schematic plan views each showing a corner of the liquid crystal display device of Comparative Embodiment 4: FIG. 21(a) is a schematic view of the formation of a liquid pool of a liquid crystal aligning agent and FIG. 21(b) is a schematic view of an overflow from a groove. The arrows in FIG. 21 indicate the flow of a liquid crystal aligning agent.

When the alignment film is formed by an ink-jet method, for example, the spread of the less viscous liquid crystal aligning agent is difficult to control, and the edge accuracy of the alignment film is difficult to obtain. The edge accuracy can be obtained by forming multiple grooves, even when the liquid crystal aligning agent is less viscous. However, since the liquid crystal aligning agent inevitably flows to gather at the corners of the liquid crystal panel, phenomena that do not occur at the middle of the periphery of the liquid crystal panel may occur at the corners of the liquid crystal panel.

The phenomena occurring at the corners of the liquid crystal panel include a liquid pool of the liquid crystal aligning agent. Although as shown in FIG. 21(a), the grooves 150R can block the spread of a liquid crystal aligning agent 30PR and the edge accuracy of the alignment film can be obtained, the liquid crystal aligning agent 30PR flows to gather at each corner of the liquid crystal panel and accumulates on the display region 10R side of the corner. Thereby, display unevenness is visible at the corner of the liquid crystal panel.

The phenomena occurring at the corners of the liquid crystal panel include an overflow from the groove. As shown in FIG. 21(b), the liquid crystal aligning agent 30PR gathered at the corners of the liquid crystal panel overflows from the grooves 150R, whereby the forming position of the alignment film may not be suitably controlled.

The second groove 160 of the present embodiment in a plan view includes an uneven portion at each corner 103 of the first substrate 100. As shown in FIG. 13, the uneven portion of the second groove 160 can prevent the liquid crystal aligning agent from flowing toward the corner 103 of the first substrate 100. Thereby, the liquid crystal aligning agent can be prevented from gathering at the corner 103 of the first substrate 100. Further, since the second groove 160 is formed between the first groove 150 and the display region 10, the first groove 150 can block the liquid crystal aligning agent even when the liquid crystal aligning agent overflows from the second groove 160 at the corner 103 of the first substrate 100. Thus, even in the case of the less viscous liquid crystal aligning agent, the unevenness of the thickness of the alignment film 30 can be effectively reduced at the corner 103, and the position of the edge of the alignment film 30 at the corner 103 can be suitably adjusted. The corners 103 of the first substrate 100 correspond to the corners of the liquid crystal panel.

The uneven portion of the second groove 160 may have any shape that includes recesses and protrusions. The uneven portion is in the form of, for example, a rectangular wave, repetition of V-shaped notches, or repetition of U-shaped notches. It is particularly preferably in the form of a rectangular wave.

In the present embodiment, the width W1 of the uneven portion is preferably 1 mm or greater and 10 mm or smaller, more preferably 3 mm or greater and 5 mm or smaller.

Figure 14:
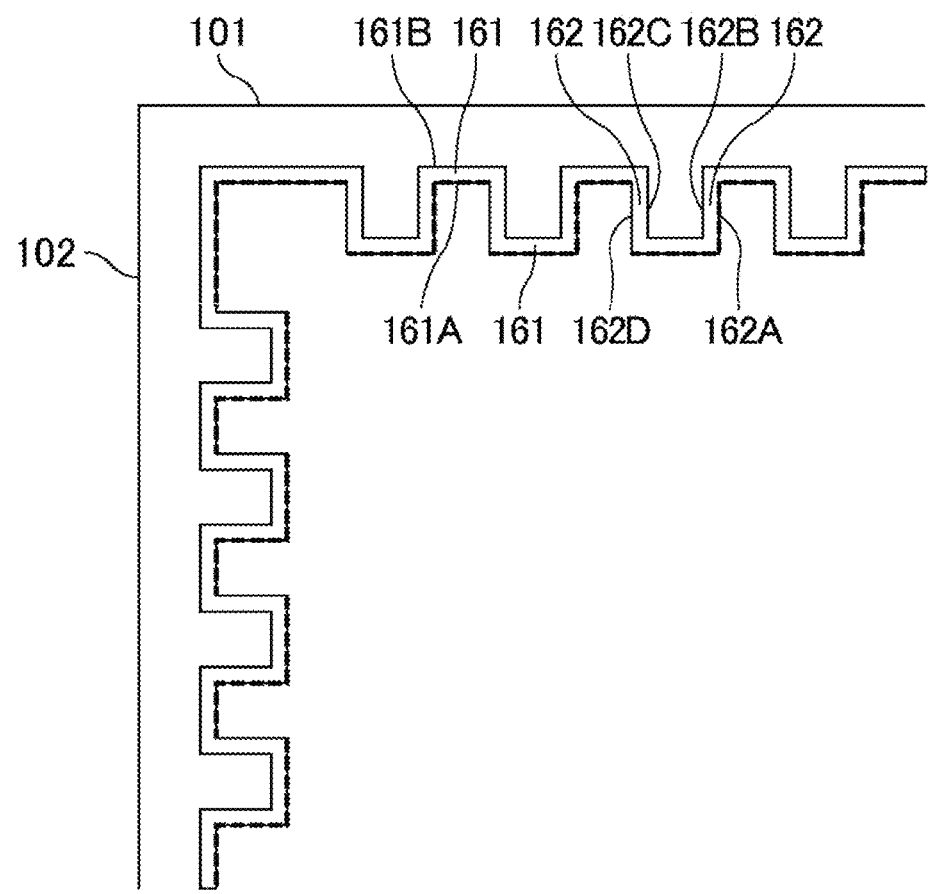
FIG. 14 is a schematic plan view of a second groove of the liquid crystal display device of Embodiment 4.
Figure 15:
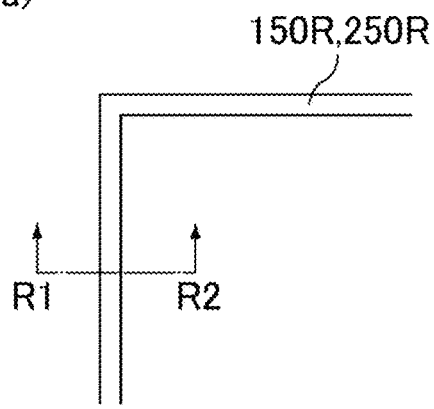
FIG. 15 includes views each showing a liquid crystal display device of Comparative Embodiment 1.
Figure 15:
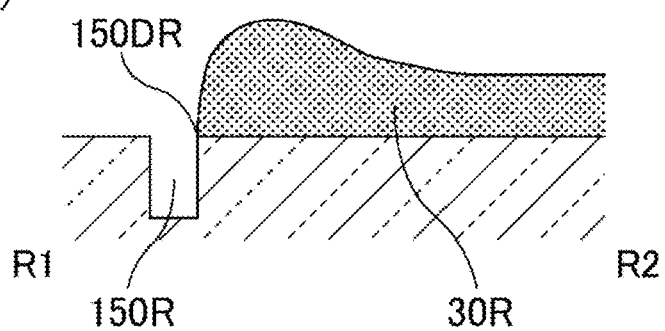
Figure 15:
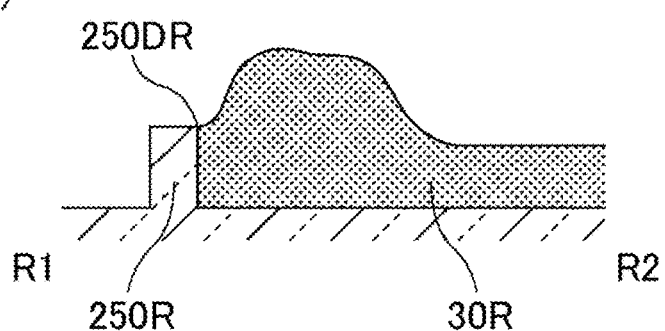
Figure 16:
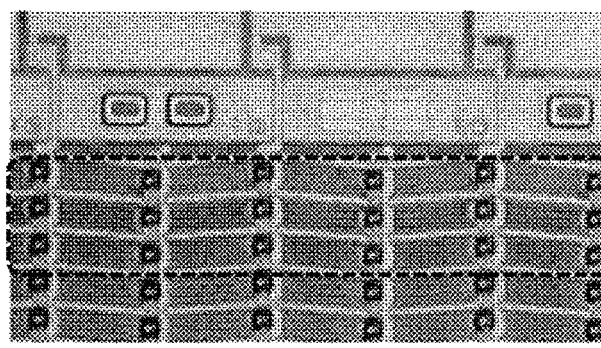
FIG. 16 is a micrograph of the boundary between a display region and a frame region of a TFT substrate of the liquid crystal display device of Comparative Embodiment 1.
Figure 17:
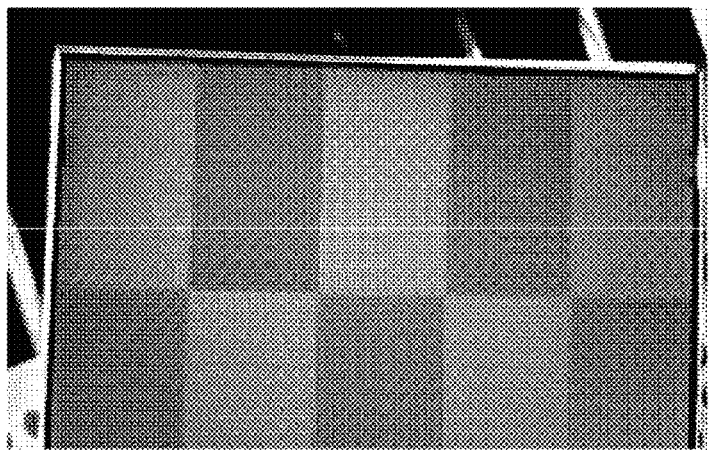
FIG. 17 is a photograph of stain in the display region of the liquid crystal display device of Comparative Embodiment 1.

The following describes a preferred embodiment of the uneven portion of the second groove 160. FIG. 14 is a schematic plan view of a second groove of the liquid crystal display device of Embodiment 4. In FIG. 14, the side walls having a relatively small inclination are traced with a dashed line. The second groove 160 preferably has a structure shown in FIG. 14. In other words, the uneven portion of the second groove 160 has a rectangular waveform, the portion having a rectangular waveform of the second groove 160 includes parallel portions 161 each extending along the first side 101 of the first substrate 100 and crossing portions 162 each extending in a direction crossing the first side 101. Each parallel portion 161 includes a third side wall 161A on the display region 10 side and a fourth side wall 161B on the side remote from the display region 10. The third side wall 161A has a smaller inclination than the fourth side wall 161B. Owing to such a structure, the third and fourth side walls 161A and 161B of each parallel portion 161 can function similarly to the first and second side walls 150A and 150B, respectively.

The crossing portions 162 include a crossing portion including paired side walls 162A and 162B and a crossing portion including paired side walls 162C and 162D. Among the four side walls 162A, 162B, 162C, and 162D of the two crossing portions 162 constituting a protrusion protruding to the display region side 10 of the uneven portion having a rectangular waveform, the side wall 162A remotest from the second side 102 of the first substrate 100 has a smaller inclination than any of the other three side walls 162B, 162C, and 162D.

When the four side walls of the crossing portions all have a large inclination, the liquid crystal aligning agent rebounds due to the surface tension at the upper edges of the side walls and accumulates in waveform on the display region side, causing unevenness. In the present embodiment, among the four side walls 162A, 162B, 162C, and 162D of the crossing portions 162, the side wall 162A that is remotest from the second side 102 of the first substrate 100 has a smaller inclination than the side walls 162B, 162C, and 162D. This structure allows the liquid crystal aligning agent to flow into the second groove 160, preventing the liquid crystal aligning agent from accumulating on the display region 10 side. Thereby, unevenness of the thickness of the alignment film at the corner 103 can be reduced, and display unevenness can be reduced at the corner of the display region. Further, even when the liquid crystal aligning agent flowing into the second groove 160 overflows from the second groove 160, the groove 150 disposed remoter from the display region 10 than the second groove 160 can block the liquid crystal aligning agent. As a result, the position of the edge of the alignment film 30 can be suitably adjusted at the corner 103.

When the uneven portion has a rectangular waveform, the parallel portions 161 each preferably have a length of 50 μm or greater and 200 μm or smaller. The lengths of the parallel portions are more preferably stepwise set longer as they are closer to the top of the corner 103 (e.g., the lengths of the parallel portions 161 are varied from 50 μm to 100 μm to 150 μm toward the top of the corner 103 (gradation is imparted)). The crossing portions 162 preferably have a length of 50 μm or greater and 200 μm or smaller. The lengths of the crossing portions are more preferably stepwise set longer as they are closer to the top of the corner 103 (e.g., the lengths of the crossing portions 162 are varied from 50 μm to 100 μm to 150 μm toward the top of the corner 103 (gradation is imparted)).

Embodiment 5

In the present embodiment, features unique to the present embodiment are mainly described, and the same features as those in the above embodiments are not described again. The above embodiments describe the case where the groove(s) 150 are formed in the first substrate 100. The groove(s) 150 may be formed in the second substrate 200. When the groove(s) 150 are formed in the second substrate 200, they may be formed in an overcoat layer 230, for example.

[Additional Remarks]

One aspect of the present invention may be the liquid crystal display device 1 including the display region 10 for displaying an image, the frame region 20 surrounding the display region 10, the first substrate 100 including the insulating substrate 110, the second substrate 200 facing the first substrate 100, the liquid crystal layer 300 between the first substrate 100 and the second substrate 200, and the alignment film 30 on the liquid crystal layer 300 side of the insulating substrate 110, the first substrate 100 in a plan view including the groove 150 extending to surround the display region 10, the groove 150 including the first side wall 150A on the display region 10 side and the second side wall 150B on the side remote from the display region 10, the first side wall 150A having a smaller inclination than the second side wall 150B.

Since the first side wall 150A has a smaller inclination than the second side wall 150B in the groove 150, the surface tension at an upper edge 150D of the first side wall 150A is low, and the excess liquid crystal aligning agent easily flows into the groove 150 along the first side wall 150A when the liquid crystal aligning agent is applied to form the alignment film 30. Thereby, less excess liquid crystal aligning agent accumulates on the display region 10 side of the groove 150, and unevenness of the thickness of the alignment film 30 can be reduced. Thus, display unevenness can be reduced in the edge portion of the display region 10. Further, since the first side wall 150A has a smaller inclination than the second side wall 150B, that is, the second side wall 150B has a larger inclination than the first side wall 150A, the liquid crystal aligning agent flowing into the groove 150 does not easily spread out over the second side wall 150B due to the surface tension at the upper edge 150F of the second side wall 150B and can be prevented from flowing out toward the side remote from the display region 10. Thereby, the position of an edge of the alignment film 30 can be suitably adjusted, and the forming position of the alignment film 30 can be suitably adjusted.

The first side wall 150A may have an average inclination angle of less than 50°, and the second side wall 150B may have an average inclination angle of 60° or more and 90° or less.

Owing to such a structure, the surface tension at the upper edge 150D of the first side wall 150A is low, and the excess liquid crystal aligning agent easily flows into the groove 150 along the first side wall 150A. Thus, display unevenness can be reduced in the edge portion of the display region 10. Further, the agent is more effectively blocked by the surface tension at the upper edge 150F of the second side wall 150B. Thus, the forming position of the alignment film 30 can be suitably adjusted.

The first side wall 150A may have an inclination increasing toward the lower edge 150E from the upper edge 150D.

Owing to such a structure, the surface tension at the upper edge 150D of the first side wall 150A is low, and the liquid crystal aligning agent easily enters the groove 150 from the display region 10 side. Further, the liquid crystal aligning agent further easily flows into the groove 150 as it comes close to the lower edge 150E of the first side wall 150A. Thus, the liquid crystal aligning agent further smoothly flows into the groove 150, hardly causing display unevenness in the edge portion of the display region 10.

The first substrate 100 may include a plurality of the grooves 150.

Owing to such a structure, these grooves 150 block the liquid crystal aligning agent in multiple steps, allowing more suitable adjustment of the forming position of the alignment film 30. Thus, for example, even when the liquid crystal aligning agent is less viscous, the forming position of the alignment film 30 can be suitably adjusted.

The groove 150 may be the first groove, the first substrate 100 in a plan view has the corner 103 formed by the first side 101 and the second side 102 and further includes the second groove 160, the second groove 160 in a plan view is disposed between the first groove 150 and the display region 10 and extends to surround the display region 10, and the second groove 160 in a plan view includes an uneven portion at the corner 103 of the first substrate 100.

The second groove 160 in a plan view includes an uneven portion at the corner 103 of the first substrate 100. The uneven portion of the second groove 160 can prevent the liquid crystal aligning agent from flowing toward the corner 103 of the first substrate 100. Thereby, the liquid crystal aligning agent can be prevented from gathering at the corner 103 of the first substrate 100. Further, since the second groove 160 is formed between the first groove 150 and the display region 10, the first groove 150 can block the liquid crystal aligning agent even when the liquid crystal aligning agent overflows from the second groove 160 at the corner 103 of the first substrate 100. Thus, even in the case of the less viscous liquid crystal aligning agent, the unevenness of the thickness of the alignment film 30 can be effectively reduced at the corner 103, and the position of the edge of the alignment film 30 at the corner 103 can be suitably adjusted.

The uneven portion may have a rectangular waveform, the uneven portion having a rectangular waveform of the second groove 160 includes the parallel portions 161 each extending along the first side 101 of the first substrate 100 and the crossing portions 162 each extending in a direction crossing the first side 101; the parallel portions 161 each include the third side wall 161A on the display region 10 side and the fourth side wall 161B on the side remote from the display region 10; the third side wall 161A has a smaller inclination than the fourth side wall 161B; the crossing portions 162 includes a crossing portion including paired side walls 162A and 162B and a crossing portion including paired side walls 162C and 162D; and among the four side walls 162A, 162B, 162C, and 162D of the two crossing portions 162 constituting a protrusion protruding to the display region 10 side of the uneven portion having a rectangular waveform, the side wall 162A remotest from the second side 102 of the first substrate 100 has a smaller inclination than any of the other three side walls 162B, 162C, and 162D.

Owing to such a structure, the third and fourth side walls 161A and 161B of each parallel portion 161 can function similarly to the first and second side walls 150A and 150B, respectively. Further, among the four side walls 162A, 162B, 162C, and 162D of the crossing portions 162, the side wall 162A that is remotest from the second side 102 of the first substrate 100 has a smaller inclination than the side walls 162B, 162C, and 162D. This structure allows the liquid crystal aligning agent to flow into the second groove 160, preventing the liquid crystal aligning agent from accumulating on the display region 10 side. Thereby, unevenness of the thickness of the alignment film at the corner 103 can be reduced, and display unevenness can be reduced at the corner of the display region. Further, even when the liquid crystal aligning agent flowing into the second groove 160 overflows from the second groove 160, the groove 150 disposed remoter from the display region 10 than the second groove 160 can block the liquid crystal aligning agent. Thus, the position of the edge of the alignment film 30 can be suitably adjusted at the corner 103.

The liquid crystal display device 1 may further include the sealing member 400 that is in contact with the first substrate 100 and the second substrate 200 and extends to surround the display region 10 in a plan view, and the groove 150 in a plan view is closer to the display region 10 than the sealing member 400.

Owing to such a structure, the groove 150 can prevent contact between the sealing member 400 and the alignment film 30 and can increase the adhesion between the first substrate 100 and the second substrate 200.

The liquid crystal display device 1 may further include the sealing member 400 that is in contact with the first substrate 100 and the second substrate 200 and extends to surround the display region 10 in a plan view, and the groove 150 in a plan view at least partly overlaps the sealing member 400.

Such a structure enables elimination of a gap between the alignment film 30 and the sealing member 400, whereby a narrow frame can be achieved.

REFERENCE SIGNS LIST 1, 1R: Liquid crystal display device
10, 10R: Display region
20, 20R: Frame region
30, 30R, 40, 40R: Alignment film
30PR: Liquid crystal aligning agent
100, 100R: First substrate
101: First side
102: Second side
103: Corner
110, 110R, 210, 210R: Insulating substrate
120, 120R: Transparent organic insulating film
130, 130R: Pixel electrode
150, 150R: Groove (first groove)
150A, 150AR: First side wall
150B, 150BR: Second side wall
150C: Bottom face
150D, 150DR, 150F, 150FR, 250DR: Upper edge
150E: Lower edge
160: Second groove
161: parallel portion
161A: Third side wall
161B: Fourth side wall
162: Crossing portion
162A, 162B, 162C, 162D: Side wall
200, 200R: Second substrate
221, 221R: Color material layer
222, 222R: Black matrix layer
230, 230R: Overcoat layer
250, 250R: Rib
300, 300R: Liquid crystal layer
400, 400R: Sealing member
D: Depth
W1: Width

The invention claimed is:
1. A liquid crystal display device comprising:
a display region for displaying an image;
a frame region surrounding the display region;
a first substrate including an insulating substrate;
a second substrate facing the first substrate;
a liquid crystal layer between the first substrate and the second substrate; and
an alignment film on a liquid crystal layer side of the insulating substrate,
the first substrate in a plan view including a groove extending to surround the display region, the groove including a first side wall on a display region side and a second side wall on a side remote from the display region, the first side wall having a smaller inclination than the second side wall.
2. The liquid crystal display device according to claim 1, wherein the first side wall has an average inclination angle of less than 50°, and the second side wall has an average inclination angle of 60° or more and 90° or less.
3. The liquid crystal display device according to claim 1, wherein the first side wall has an inclination increasing toward a lower edge from an upper edge.
4. The liquid crystal display device according to claim 1, wherein the first substrate includes a plurality of the grooves.
5. The liquid crystal display device according to claim 1, wherein the groove is a first groove,
the first substrate in a plan view has a corner formed by a first side and a second side and further includes a second groove,
the second groove in a plan view is disposed between the first groove and the display region and extends to surround the display region; and
the second groove in a plan view includes an uneven portion at the corner of the first substrate.
6. The liquid crystal display device according to claim 5, wherein the uneven portion has a rectangular waveform,
the uneven portion having a rectangular waveform of the second groove includes parallel portions each extending along the first side of the first substrate and crossing portions each extending in a direction crossing the first side,
the parallel portions each include a third side wall on the display region side and a fourth side wall on the side remote from the display region,
the third side wall has a smaller inclination than the fourth side wall,
the crossing portions each include paired side walls, and
among four side walls of two of the crossing portions constituting a protrusion protruding to the display region side of the uneven portion having a rectangular waveform, a side wall remotest from the second side of the first substrate has a smaller inclination than any of the other three side walls.
7. The liquid crystal display device according to claim 1, further comprising
a sealing member that is in contact with the first substrate and the second substrate and extends to surround the display region in a plan view,
wherein the groove in a plan view is closer to the display region than the sealing member.
8. The liquid crystal display device according to claim 1, further comprising
a sealing member that is in contact with the first substrate and the second substrate and extends to surround the display region in a plan view,
wherein the groove in a plan view at least partly overlaps the sealing member.

* * * * *